(12) United States Patent
Kopf et al.

(10) Patent No.: US 7,544,296 B2
(45) Date of Patent: Jun. 9, 2009

(54) METHOD AND APPARATUS FOR SEPARATION OF MILK, COLOSTRUM, AND WHEY

(75) Inventors: Henry B. Kopf, Cary, NC (US); Henry Kopf, III, Cary, NC (US)

(73) Assignee: NCSRT, Inc., Apex, NC (US)

( * ) Notice: Subject to any disclaimer, the term of this patent is extended or adjusted under 35 U.S.C. 154(b) by 1212 days.

(21) Appl. No.: 10/748,962

(22) Filed: Dec. 29, 2003

(65) Prior Publication Data

US 2004/0139864 A1 Jul. 22, 2004

Related U.S. Application Data

(62) Division of application No. 09/950,096, filed on Sep. 10, 2001, now Pat. No. 6,875,459.

(51) Int. Cl.
  *A61M 1/16* (2006.01)
  *A23J 1/09* (2006.01)
  *A23C 9/154* (2006.01)

(52) U.S. Cl. ............ 210/257.2; 210/195.2; 210/641; 210/651; 426/490; 426/580

(58) Field of Classification Search ........... 210/257.2, 210/195.2, 650–654, 641; 426/491, 522, 426/580, 478, 490, 582, 583; 119/14.01; 536/127, 387.1
See application file for complete search history.

(56) References Cited

U.S. PATENT DOCUMENTS 4,042,576 A 8/1977 Eustache et al.
4,876,100 A * 10/1989 Holm et al. ............. 426/491
4,897,465 A * 1/1990 Cordle et al. ............ 530/387.1
4,970,989 A * 11/1990 Lidman .................. 119/14.01
5,118,516 A 6/1992 Shimatani
5,356,651 A * 10/1994 Degen et al. ............ 426/491

(Continued)

FOREIGN PATENT DOCUMENTS

EP 0 604 684 7/1994

(Continued)

OTHER PUBLICATIONS

Mulder, M. (1991) Basic Principles of Membrane Technology, Kluwer Academic Pub. Dordrecht, The Netherlands, 1991, pp. 318-325, 328-329 and 334-335.

(Continued)

*Primary Examiner*—Ana M Fortuna
(74) *Attorney, Agent, or Firm*—Marianne Fuierer; Moore & Van Allen PLLC

(57) ABSTRACT

Apparatus and method for separation of milk and milk products, e.g., involving sequential separation of milk, clostrum, and whey components by cross-flow filtration. The apparatus and method in a preferred aspect employ cross-flow filtration, chromatography and fermentation to separate and fully utilize the components of milk, clostrum, and whey to generate numerous individual components, minimize waste, lower adverse environmental issues and provide enhanced economic benefits to dairy producers. A wide variety of consumer and nutraceutical products can be produced from the fractions and/or sub-fractions of milk products obtained from such separation. The invention further contemplates a methodology for selecting optimum membrane, device, and operating conditions to achieve a desired separation.

14 Claims, 14 Drawing Sheets

U.S. PATENT DOCUMENTS

| | | | | |
|---|---|---|---|---|
| 5,401,523 | A * | 3/1995 | Degen et al. | 426/580 |
| 5,679,780 | A | 10/1997 | Jensen | |
| 6,139,746 | A * | 10/2000 | Kopf | 210/635 |
| 6,288,222 | B1 * | 9/2001 | Roth et al. | 536/127 |
| 6,326,044 | B1 * | 12/2001 | Lindquist | 426/491 |
| 6,426,109 | B1 * | 7/2002 | Ehsani et al. | 426/580 |
| 6,596,172 | B1 * | 7/2003 | Kopf | 210/635 |
| 6,652,900 | B2 * | 11/2003 | Lindquist | 426/522 |
| 6,737,096 | B2 * | 5/2004 | Lindquist | 426/522 |
| 6,824,809 | B2 * | 11/2004 | Goudedranche et al. | 426/580 |
| 6,827,960 | B2 * | 12/2004 | Kopf et al. | 426/491 |
| 6,852,352 | B2 * | 2/2005 | Kopf et al. | 426/657 |
| 6,875,459 | B2 * | 4/2005 | Kopf et al. | 426/491 |
| 6,946,075 | B2 * | 9/2005 | Kopf | 210/635 |
| 7,214,319 | B2 * | 5/2007 | Yen et al. | 210/651 |

FOREIGN PATENT DOCUMENTS

| | | |
|---|---|---|
| NZ | 226344 | 8/1991 |
| NZ | 241741 | 11/1993 |
| NZ | 240725 | 5/1994 |

OTHER PUBLICATIONS

Glover, F.A., Ultrafiltration and reverse osmosis for the dairy industry, Reading, England 1985, pp. 16-17, 28-29, 46-47 and 60-61.

Maubois J. and Oliverier G., Milk Protein Fractionation, New Applications of Membrane Processes, International Dairy Federation special Issue No. 9201, 1991 pp. 15-22.

Sarney, D.B., A Novel Approach to the Recovery of Biologically Active Oligosaccharide from Milk using a Combination of Enzymatic Treatment and Nanofiltration, Biotechnology and Bioengineering, V. 69 (4), Aug. 20, 2000, pp. 461-467.

Huffman LM and Harper WJ, Maximizing the Value of Milk Through Separation Technologies, Symposium: Marketing Dairy Value through Technology, Journal of Dairy Science, V 82, pp. 2238-2244 1999.

Maynard, F., Preparation de lactoferrine et d' alpha lactalbumine humaines par utilization de techniques a membranes Le Lait (1989) V. 69, pp. 59-69.

Novak, A. Milk Protein Concentrate, New Applications of Membrane Processes, International Dairy Federation special Issue No. 9201, 1991 pp. 51-66.

Jelen, P., Pressured driven membrane Processes: Principles and Definitions, New Applications of Membrane Processes, International Dairy Federation special Issue No. 9201, 1991 pp. 7-14.

Mistry, VV and Hassan HN, High Protein Lactose Free Milk Powders, Production and Composition, ADSA Annual Meeting, JDS vol. 73, Suppl 1D 134 , p. 113 (1990).

Maubois JL, Applications of membrane techniques in the Dairy Industry-Proposals for a new IDF group of Experts, Bulletin of IDF No. 244, pp. 26-29, 1989.

Jensen et al. Functionality and application of dairy ingredients in dairy products, Food Technology V 41 p. 66, 1989.

Hurwitz, MF and Brantley, JD, Shear separation: A promising method of protein fractionation, Lait vol. 80, pp. 121-127, 2000.

* cited by examiner

METHOD AND APPARATUS FOR SEPARATION OF MILK, COLOSTRUM, AND WHEY

CROSS-REFERENCE TO RELATED APPLICATION

This is a divisional application claiming priority under the provisions of 35 U.S.C. 120 from U.S. patent application Ser. No. 09/950,096 filed Sep. 10, 2001 now U.S. Pat. No. 6,875,459 in the names of Hank and Henry Kopf for "METHOD AND APPARATUS FOR SEPARATION OF MILK, COLOSTRUM, AND WHEY."

FIELD OF THE INVENTIOIN

The present invention relates to method and apparatus for sequential separation of various nutritional components of milk, particularly sequential separation of various milk proteins, carbohydrates, enzymes, and minerals contained in milk, colostrum, whey, or other diary products, using cross-flow filtration modules.

BRIEF DESCRIPTION OF THE RELATED ART

Milk contains various useful and beneficial components. Butterfat, casein, and lactose are the most commonly known dairy components. Some other components, which are equally important although less known, include lactoferrin, lactoperoxidase, immunoglobulins, sialyllactose, phospholipids, α-lactalbumin, and β-lactoglobulin.

Cheese manufacturing processes involve separation of casein, an insoluble protein contained in whole milk, from other components of milk by precipitation. The two predominant precipitation techniques are rennet precipitation and acid precipitation, which are alternatively utilized, depending on the specific type of cheese to be produced.

The supernatant fluid generated during cheese manufacturing process is commonly referred to as whey. Proteins contained in whey, which are soluble proteins including lactoferrin, lactoperoxidase, immunoglobulins, albumin, α-lactalbumin, and β-lactoglobulin, are historically referred to as whey proteins. In the present application, the terms "whey proteins" and "milk proteins" are synonymous with one another, and are used interchangeably to refer to those soluble proteins contained in milk, in contrast to the insoluble components such as casein.

Whey, a byproduct of the cheese manufacturing process, has long been the predominant source of milk proteins, and significant efforts have been devoted to separation and isolation of various whey proteins. Despite the intensive efforts that have been focused on achieving this objective, the separation and isolation of various whey proteins, such as the aforementioned lactoferrin, lactoperoxidase, immunoglobulins, albumin, α-lactalbumin, and β-lactoglobulin, still heavily depend on use of conventional chromatography and precipitation methods.

The chromatography separation method is expensive and complex, requiring continual replacement of the chromatographic resin, as well as adjustments of pH value and ion concentration of the whey prior to the chromatography separation process.

Moreover, chromatography separation is suitable only for post-casein-precipitation protein extraction, because it necessarily requires whey instead of whole milk as the starting material.

Further, the conventional chromatographic separation method undesirably changes the natural quality and character of milk, by adding chemical additives thereto, in order to effect separation and to enhance product yield.

In one approach to chromatographic separation of milk, Mozaffar et al. U.S. Pat. No. 6,096,870, entitled "Sequential Separation of Whey" and issued Aug. 1, 2000, discloses a milk chromatographic purification method, comprising the following thirteen steps:

1) adding rennet to precipitate casein;
2) clarifying the whey using a clarifier;
3) centrifuging the whey to remove fat components;
4) adjusting pH value of the whey to 3.8 by addition of acetic acid;
5) loading the whey on an anion exchange chromatographic column;
6) column washing using 0.05 M sodium acetate;
7) elution with 0.1 M sodium acetate and 0.5 M sodium chloride to separate immunoglobulin and β-lactoglobulin;
8) column reconditioning with 0.05 sodium acetate;
9) eluting for the second time with 0.1 M sodium acetate and 0.1 M sodium chloride to separate α-lactalbumin;
10) column reconditioning for the second time with 0.05M sodium acetate;
11) eluting for the third time with 0.05M sodium phosphate to separate bovine serum albumin;
12) eluting for the fourth time with 0.05 M sodium phosphate and 0.5 M sodium chloride to separate lactoferrin; and
13) cleaning the chromatographic column with sodium hydroxide, sodium chloride, and alcohol.

Clearly, such chromatography separation process, by adding one or more precipitants, i.e., rennet or acid, and one or more other solutions such as sodium acetate, sodium chloride, and sodium phosphate into the whey, substantially and undesirably alters the natural quality and character of milk. Moreover, the chromatography process incurs additional expenses relating to necessary downstream removal of those unnatural additives from the separated whey proteins, which otherwise constitute contaminants that compromise the nutritional and compositional integrity of the natural milk products.

Similarly, conventional precipitation method for purifying whey proteins also requires adjustment of pH value and temperature, and addition of various chemicals and salts that are not natural components of milk. For example, selective precipitation of β-lactoglobulin from whey requires adjustment of the pH value of whey to 4.65, which undesirably alters the natural quality of whey.

See Amundson, C. H., Watanawanichakorn, S., and Hill, C. G., *Production of Enriched Protein Fractions of Beta-Lactoglobulin and Alpha-Lactalbumin from Cheese Whey*, JOURNAL OF FOOD PROCESSING AND PRESERVATION, vol. 6, pp. 55-71 (1982).

It is therefore an object of the present invention to sequentially separate various milk components, without introducing unnatural additives.

It is another object of the present invention to provide an integral separation system for sequential separation and isolation of beneficial milk proteins, with significantly improved efficiency and reduced costs, suitable for commercial scale-up and mass production of purified milk proteins.

It is yet anther object of the present invention to separate the milk proteins without first precipitating casein.

Other objects and advantages of the invention will be more fully apparent from the ensuing disclosure and appended claims.

SUMMARY OF THE INVENTION

The invention relates in one broad aspect to a method and apparatus for separating raw milk, milk-based diary product, or dairy waste into multiple components in a sequential fashion, using cross-flow filtration modules, as described more fully hereinafter.

In one specific aspect, the present invention relates to a method for separating milk by cross-flow filtration, comprising the steps of:
 a) providing a milk source;
 b) effectuating flow of milk from the milk source through one or more cross-flow filtration modules, using a fluid delivery means, wherein each fluid delivery means is connected to at least one cross-flow filtration module; and
 c) sequentially capturing one or more filtration fractions generated by the cross-flow filtration modules.

The term "milk" in the present application means any type of natural or modified dairy products, including, but not limited to: milk, whole milk, skim milk, milk fat, colostrum, whey, milk concentrates, milk dilutes, milk subcomponents, milk isolates, and other lactic outputs from bovine, human, goat, rabbit, deer, or other mammals, as well as mixtures of two or more of the foregoing.

In another specific aspect, the present invention relates to an apparatus for isolating and purifying one or more milk components, comprising:
 a) a milk source;
 b) one or more cross-flow filtration modules communicatively connected to the milk source, for generating one or more filtration fractions;
 c) one or more fluid delivery means connected to each of the cross-flow filtration modules for creating sufficient flow of milk through the cross-flow filtration modules to effect separation of milk components; and
 d) one or more means downstream of each of the cross-flow filtration modules for sequentially capturing one or more fractions generated by the cross-flow filtration modules.

"Cross-flow filtration module" refers herein to a type of filter module or filter cassette that comprises a porous filter element across a surface of which the liquid medium to be filtered is flowed in a tangential flow fashion, for permeation through the filter element of selected component(s) of the liquid medium.

In a cross-flow filtration module employed in the present invention, the shear force exerted on the filter element (separation membrane surface) by the flow of the liquid medium serves to oppose accumulation of solids on the surface of the filter element. Useful cross-flow filters include microfiltration, ultrafiltration, nanofiltration and reverse osmosis filter systems. The cross-flow filter may comprise a multiplicity of filter sheets (filtration membranes) in an operative stacked arrangement, e.g., wherein filter sheets alternate with permeate and retentate sheets, and as a liquid to be filtered flows across the filter sheets, impermeate (non-permeating) species, e.g., solids or high-molecular-weight species of diameter larger than the filter sheet's pore size(s), are retained and enter the retentate flow, and the liquid along with any permeate species diffuse through the filter sheet and enter the permeate flow. In a preferred embodiment of the present invention, such cross-flow filtration module comprises a permeate collection and discharge arrangement, a feed inlet, a retentate outlet, and multiple fluid-flow sub-channels that may for example be equidistant to the inlet and the outlet.

Cross-flow filtration modules and cross-flow filter cassettes useful in practice of the present invention are commercially available from North Carolina SRT, Inc. (Cary, N.C.), and are variously described in the following United States patents of Henry B. Kopf: U.S. Pat. No. 4,867,876, "Filter Plate, Filter Plate Element, and Filter Comprising Same, issued Sep. 19, 1989; U.S. Pat. No. 4,882,050, same title, issued Nov. 21, 1989; U.S. Pat. No. 5,034,124, same title, issued Sep. 11, 1990; U.S. Pat. No. 5,049,268, same title, issued Sep. 17, 1991; U.S. Pat. No. 5,232,589, "Filter Element and Support, issued Aug. 3, 1993; U.S. Pat. No. 5,342,517, "Filter Cassette Article," issued Aug. 30, 1994; U.S. Pat. No. 5,593,580, same title, issued Jan. 14, 1997; and U.S. Pat. No. 5,868,930, same title, issued Feb. 9, 1999; the disclosures of all of which are hereby incorporated herein by reference in their respective entireties.

One specific aspect of the present invention relates to separation of a casein-rich fraction and a casein-depleted fraction of milk, comprising the steps of:
 a) providing a source of milk;
 b) optionally flowing the milk through a cream separator to remove all or at least a portion of the fatty component of the milk;
 c) optionally pasteurizing the milk, using a pasteurizer;
 d) flowing the milk through a cross-flow filtration module to separate the milk into a casein-rich retentate fraction and a casein-depleted permeate fraction; and
 e) recovering both the casein rich fraction and the casein depleted fraction generated by the cross-flow filtration module.

The casein-rich fraction generated by such process can be used for manufacturing various dairy products, such as cheese, milk powder, and substrate for cheese production or milk protein concentrate. The casein-depleted fraction generated by such process contains various soluble whey proteins, such as IgG, albumin, alpha- and beta-lactoglobulin, and it can be used for manufacturing of whey protein isolates, subcomponents, and concentrates.

During prior art cheese-making processes, whey proteins are usually harvested from the supernatant waste of cheese manufacturing and therefore contain casein-precipitants such as rennet or acid, which deleteriously reduce the quality and nutritional value of the whey proteins thus obtained.

By contrast, the method of the present invention separates casein from the milk without introducing any chemical precipitants that will undermine the nutritional integrity of natural milk. Thus, the casein-separation process according to the present invention creates two liquid fractions, one being enriched in casein and the other being depleted of casein, in which both are free of chemical precipitants. The casein-depleted fraction is a clear yellow-green liquid containing unaltered immunoglobulins, α-lactalbumin, β-lactoglobulin, bovine serum albumin, lactoferrin, lactoperoxidase, immunoglobulins, carbohydrates, peptides, sialyllactose and lactose, which can be subject to further uses.

Moreover, in the mass production of milk proteins and powder milk, it is desirable to utilize all of the beneficial components of the milk feedstock. A preferred aspect of the present invention therefore relates to an integral process for sequentially isolating each of multiple useful components of milk, thereby separating milk into multiple fractions to facilitate efficient uses of each fraction, with minimal waste of beneficial components.

Such integral process comprises the steps of:
1) providing a milk source;
2) optionally removing all or at least a portion of fatty component of the milk supplied by the milk source, using a cream separator;
3) optionally pasteurizing the milk, using a pasteurizer;
4) optionally flowing the milk through a first cross-flow filtration module, which filters out matter that is not natural component(s) of milk, such as bacteria;
5) flowing the (optionally filtered) milk through a second cross-flow filtration module to separate it into a retentate casein-rich fraction and a permeate casein-depleted fraction;
6) capturing the retentate casein-rich fraction;
7) flowing the permeate casein-depleted fraction of the milk through a third cross-flow filtration module suitable to form a retentate fraction that is enriched with macromolecules such as albumin and immunoglobulins and a permeate fraction depleted in such macromolecules;
8) capturing the retentate fraction that is enriched with macromolecules such as albumin and immunoglobulins;
9) flowing the permeate fraction depleted of the macromolecules through a fourth cross-flow filtration module to form a $\beta$-lactoglobulin-rich retentate fraction and $\beta$-lactoglobulin-depleted permeate fraction;
10) capturing the $\beta$-lactoglobulin-rich retentate fraction;
11) flowing the $\beta$-lactoglobulin-depleted permeate fraction through a fifth cross-flow filtration module to form an $\alpha$-lactalbumin-rich retentate fraction and an $\alpha$-lactalbumin-depleted permeate fraction;
12) capturing the $\alpha$-lactalbumin-rich retentate fraction;
13) flowing the $\alpha$-lactalbumin-depleted permeate fraction through a sixth cross-flow filtration module to form a complex carbohydrates-rich retentate fraction and a complex carbohydrates-depleted permeate fraction;
14) capturing the complex carbohydrates-rich retentate fraction;
15) flowing the complex carbohydrates-depleted permeate fraction through a seventh cross-flow filtration module to form a lactose-rich retentate fraction and a lactose-depleted permeate fraction;
16) capturing the lactose-enriched retentate fraction;
17) discharging the lactose-depleted permeate fraction out of the system.

Such integral process enables a maximal utilization of beneficial components contained in milk. It also achieves the purpose of minimizing waste, prolonging the shelf life of the milk product, and maintaining the natural nutritional integrity of milk.

In one preferred embodiment of the present application, each of the cross-flow filtration modules comprises a permeate collection structure, an inlet, an outlet, and multiple fluid-flow sub-channels that may for example be equidistant (equally close) to the inlet and outlet. The cross-flow filtration modules are preferably connected to one or more fluid delivery (feed) means, which facilitates the flow of milk or fraction of the milk through the cross-flow filtration module at a sufficient shear rate.

It is also preferred to provide temperature controlling/monitoring means to control and monitor the temperature of the fluids processed by the cross-flow filtration modules. Since the flow rates of milk or fraction of milk through each cross-flow filtration module correlate with temperatures, such temperature controlling/monitoring means function so as to specifically enhance the speed of the separation process. Moreover, the temperature controlling/monitoring means can be used to control microbial growth and to increase membrane performance and separation characteristics.

One specific embodiment of the present invention provides means for (1) cleaning the milk-processing equipment, such as the cross-flow filtration modules and the fluid delivery means, and (2) recycling water generated by both the milk-separation process as well as the equipment-cleaning process.

In another embodiment of the present application, one or more fractions generated by the integral separation process of the invention can be further fractionated, isolated, purified, or otherwise modified.

For example, the retentate fraction enriched with albumin and immunoglobulins from the third cross-flow filtration module can be further separated and purified to form albumin and immunoglobulins, using a method such as chromatography, cross-flow chromatography, cross-flow filtration, etc. It is also preferable in respective aspects of the invention to separate and purify $\beta$-lactoglobulin and $\alpha$-lactalbumin from the $\beta$-lactoglobulin and $\alpha$-lactalbumin-rich fractions generated by the separation process, or to separate and purify complex carbohydrates from the complex carbohydrates-rich fraction, using the methods described hereinabove.

The lactose-rich retentate fraction from the seventh cross-flow filtration module can also be crystallized or fermented to form additional useful products, such as for example lactobacillus, lactic acid, and Vitamin B-12. It is also preferable in various embodiments of the invention to subject such lactose-rich fraction to a bacterial or enzymatic process to further improve its nutritious value.

Another aspect of the present invention relates to production of novel dairy products, by combining two or more milk fractions obtained from the integral separation process of the present invention. For example, one can add the fatty component of milk isolated by the cream separator to the casein-rich fraction generated by the second cross-flow filtration module, and then dry it to form milk powder enriched with milk fat. As another example, it is also desirable in various embodiments of the invention to add $\alpha$-lactalbumin to the casein-depleted fraction of the milk generated by the second cross-flow filtration module, to form an $\alpha$-lactalbumin-enriched soluble milk protein concentrate. Various other combinations of one or more milk fractions produced by the method of the present invention, are readily determinable by a person ordinarily skilled in the art.

In various specific embodiments of the invention, it is desirable to dry or otherwise condense the milk components that have been separated and purified by the methods described hereinabove, for ease of preservation, storage, and transportation. Various techniques can be employed, including, but not limited to, lyophilization, spray-drying, freeze-drying, crystallization, and evaporation.

In further embodiments of the invention, therapeutic components from milk (for example, blood clotting Factor VIII, proteins, hormones, monoclonal antibodies) of transgenic and/or hyper-immunized mammals are produced. Either column and/or cross-flow chromatography steps can be utilized in order to yield products of necessary purities, e.g., as ethical human therapeutic compounds for direct intravenous and/or intra-muscular injection.

The process of generating such an ethical human therapeutic compound of appropriate purity in one embodiment of the invention comprises the steps of:
a) providing a source of milk from either a transgenic and/or hyper-immunized mammal;
b) optionally flowing the milk from the milk source through a cream separator to remove all or at least a portion of the fatty component of such milk;

c) optionally pasteurizing the milk, using a pasteurizer;
d) optionally flowing the milk through a first cross-flow filtration module to filter out foreign matter that is not natural component(s) of milk, such as bacteria;
e) flowing the filtered milk through a second cross-flow filtration module to form a casein-rich retentate fraction and a casein-depleted permeate fraction;
f) capturing the casein-rich retentate fraction;
g) flowing the casein-depleted permeate fraction through a chromatographic resin that is capable of binding at least one target component of the milk; and
h) concentrating and/or diafiltering the eluting target component using a cross-flow chromatographic process.

The term "target component" as used herein is defined as a human therapeutic agent, e.g., a compound such as a monoclonal antibody, immunoglobulin, etc. Such target compound can be used to treat or prevent various diseases, such as gastrointestinal tract disorder, hemophillia, leukemia, liver disease, diabetes, PKU, viral diseases, bacterial diseases, osteoarthritis, enzymatic deficiencies, protein deficiencies, Alzheimers, infection and cancer. The target compound may be used to treat a mammal of the same species as that of the milk source, or a mammal of a different species from that from which the milk source is derived.

Another aspect of the present invention relates to a process for isolating siallylactose from milk, comprising:
a) optionally flowing the milk from the milk source through a first cross-flow filtration module to filter out all or at least a portion of bacteria contained therein;
b) flowing the filtered milk through a second cross-flow filtration module to separate the milk into a casein-rich fraction and a casein-depleted fraction;
c) capturing the casein-rich fraction;
d) flowing the casein-depleted fraction of the milk through a third cross-flow filtration module to form a fraction that is enriched with milk proteins selected from the group consisting of albumin, immunoglobulins, β-lactoglobulin, and α-lactalbumin, and a fraction that is depleted of said milk proteins;
e) capturing the fraction that is enriched with milk proteins selected from the group consisting of albumin, immunoglobulins, β-lactoglobulin, and α-lactalbumin;
f) flowing the fraction that is depleted of said milk proteins through a fourth cross-flow filtration module to form a sialyllactose-enriched fraction and a sialyllactose-depleted fraction;
g) capturing the sialyllactose-enriched fraction; and
f) discharging the sialyllactose-depleted fraction.

The milk separation process of the present invention enables production of many improved or entirely new dairy products which may not have been economically feasible or technically possible prior to the advent of the present invention, such as: 1) fresh or powdered milk of controlled and regulated protein content, particularly fresh or powdered milk enriched with one or more specific proteins such as α-lactalbumin, immunoglobulin, and/or lactoferrin, 2) milk protein concentrate, 3) carbohydrate-enriched milk, 4) lactose-depleted milk, 5) bovine immunoglobulin isolates; 6) drinks, shakes, milk, powders, baby food, or infant formula enriched with α-lactalbumin, carbohydrate, and/or sialyllactose, 7) purified natural sialyllactose, 8) milk enriched with various antibodies, such as *Escherichia coli* antibody, antibody to gastrointestinal tract disorders, 9) reformulated milk of one mammal which has a similar composition to another mammal's milk, particularly reformulated non-human mammalian milk having a similar composition to human breast milk, etc.

Other aspects, features and embodiments of the present invention will be more fully apparent from the ensuing disclosure and appended claims.

DETAILED DESCRIPTION OF THE INVENTION

Figure 1:
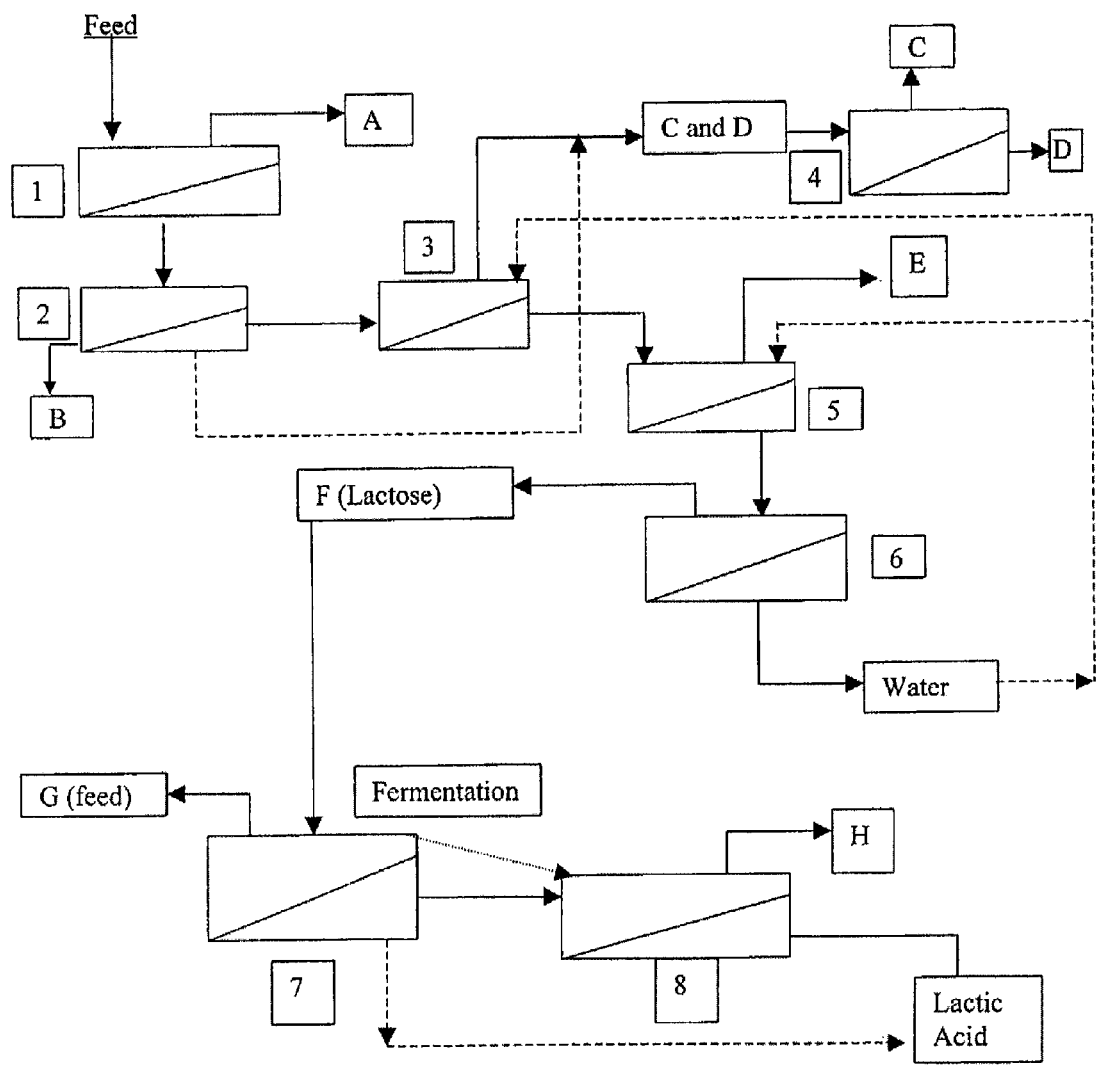
FIG. 1 is a generalized flow chart demonstrating an integral process of sequential fractionation of milk components from milk, whey, or colostrum.

Various components and subcomponents of milk differ in their physical properties, such as solubility, affinity, molecular weight, and permeability. For example, milk fat and casein are insoluble in water and therefore exist in suspended form in milk. The molecular weight of milk fat and casein are significantly larger than the molecular weights of other milk components. Milk also contains soluble whey proteins such as immunoglobulins, albumin, α-lactalbumin, and β-lactoglobulin, which have molecular weights that are smaller than the molecular weights of fat and casein, and that are larger than the molecular weights of carbohydrates. Carbohydrate components of milk are also characterized by different molecular weights; for example, complex milk carbohydrates, such as 3' sialyllactose and 6' sialyllactose, have larger molecular weights than those of simple milk carbohydrates such as lactose.

Generally, the molecular weights of various milk components can be ranked as follows:

> Fat and lipids>Insoluble casein>Immunoglobulin and albumin>β-lactoglobulin>α-lactalbumin>complex carbohydrates such as sialyllactose>simple carbohydrates such as lactose.

The present invention uses cross-flow filtration to physically separate and isolate the above listed components of milk, based on their different molecular weights and surface chemistry, and thus avoids introducing any unnatural chemical additives into the milk products.

The specificity and speed of separation using cross-flow filtration modules in accordance with the present invention is affected by various factors including: a) fluid distribution in the cross-flow module, b) channel height of the cross-flow module, c) channel length, d) shear rate, e) membrane pore structure, f) membrane structure, g) membrane chemistry, h) trans-membrane pressure, and i) pressure drop, which is a function of channel length, velocity and solution viscosity.

The present invention in one aspect optimizes the membrane separation techniques to provide an integral separation process for fractionation of milk.

Specifically, the present invention in one embodiment employs cross-flow filtration modules with sub-channels that are equidistant to the inlet and outlet of said modules. Moreover, such cross-flow filtration modules are characterized by optimal channel height, optimal transmembrane pressure, optimal membrane pore size and pore structure, optimal membrane chemistry, etc., which characteristics are selected in order to achieve the best combination of product quality and production yield.

For example, shear at the surface of the membrane is critical in minimizing gel layer formation, but excessive shear is deleterious in the following three key aspects: (1) excessive shear increases energy consumption, (2) excessive shear interferes with diffusion at the membrane surface, upon which separation process directly depends, (3) excessive shear can deprive certain compounds of their bioactivities. It therefore is desirable to maintain shear within an optimal range.

Furthermore, it is possible to optimize the separate processes with cross-flow filtration modules of variable channel velocities but of uniform channel heights, given the fact that most commercial cross-flow modules are only available in a single channel height. When the channel height of a cross-flow filtration module is known, shear is directly proportional to channel velocity of such module for the same solution being flowed through the channel.

The transmembrane pressure (TMP) of the cross-flow filtration membrane can also be optimized after the appropriate tangential velocity has been determined. Transmembrane pressure is calculated as TMP=(inlet pressure+outlet pressure)/2−permeate pressure. The purpose of optimizing the transmembrane pressure is to achieve maximum permeate flow rate. The normal relationship between transmembrane pressure and permeate flow rate can be best represented by a bell curve. Increases in transmembrane pressure cause increases in the permeate rate, until a maximum is reached, and after which any further increases in transmembrane pressure result in decreases in the permeate rate. It is therefore important to optimize the transmembrane pressure so that the maximum permeate flow rate can be obtained.

Temperature is another critical factor in optimizing the separation process. Generally, increases in temperature result in increased permeate rate of many solutions. Moreover, we have discovered via experiment that changes in filtration temperature also result in changes in the separation outcome, such as the retention and/or passage of a particular solution. For example, when the filtration temperature is kept within the range of 10° C. to 15° C., lactoferrin will pass (through the membrane of) a cross-flow filtration module manufactured by North Carolina SRT, Inc., which comprises BTS100 filtration membranes from USF Filtration, San Diego, Calif., but lactoferrin will be retained by the same filtration module at higher filtration temperatures, when all other filtration conditions are maintained the same.

Considering the optimization of membrane separation processes of the present invention, additional aspects of the invention relate to the equipment utilized in the aforementioned separation processes as well as the methods utilized in developing a specific separation process to be carried out in such equipment.

In Henry B. Kopf's earlier issued U.S. Pat. Nos. 5,593,580, 5,342,517, 4,867,876, 5,868,930, 4,882,050, 5,049,268 and 5,232,589, various preferred designs for cross-flow filtration devices, ancillary equipment and associated methods are disclosed, which are beneficial in separating and recovering target substances of input fluids. The disclosures of all of such prior issued Kopf patents are hereby incorporated herein by reference, in their respective entireties. Such equipment, methods and operational protocols can be beneficially utilized to improve process performance with membranes of any generic format, such as for example, flat sheets, hollow fibers, spirals, tubular and ceramic.

In the literature, numerous techniques have been proposed to effect the separation of target substances using membrane separations with addition of foreign substances such as acid, base, salt and solvents. In contrast to these chemical additives-based methods, the methodology of the present invention permits a target substance to be separated from an input fluid by the simplest mechanical means. In the use of cross-flow filtration modules of the type described in the aforementioned Kopf patents, the specificity and speed of a desired separation is effected by a) fluid distribution in the cross-flow module, b) channel height of the cross flow module, c) channel length, d) shear rate, e) membrane pore structure, f) membrane structure, g) membrane chemistry, h) trans-membrane pressure, and i) pressure drop, which is a function of channel length, velocity and solution viscosity.

The approaches by others involving various additives and manipulations of transmembrane pressure appear to be predicated on overcoming problems created by poor distribution of flow within the cross-flow module. It is not to say that the addition of salts and solvents do not have a place in separation but without proper flow distribution the membrane separation cannot be optimally operated nor will cleaning techniques be fully beneficial. It will be appreciated, based on the disclosure herein, that numerous heretofore expensive or difficult separations are rendered far simpler and more economical by employing the techniques described herein.

Thus, the invention relates in another aspect to optimizing the membrane separation process, comprising:

selecting a cross-flow membrane module wherein the distance from the inlet port to the outlet port is equidistant from the inlet to outlet for each sub-channel of the device, i.e., each sub-channel is of a same dimensional character;
selecting an optimal channel height;
selecting an optimal shear rate and/or channel velocity;
selecting an optimal transmembrane pressure;
selecting an optimal membrane pore size;
selecting an optimal membrane chemistry;
selecting an optimal membrane pore structure;
selecting an optimal temperature;
selecting an optimal channel length; and
selecting an optimal pressure drop which is the composite of the optimal channel height;
the optimal shear rate and/or channel velocity;
optimal channel length; and
the viscosity of the solution being filtered.

As previously described the distribution of flow is critical for development and scale-up of any separation technique, since without uniform distribution of flow, the device will not be capable of proper process scale-up or suitable cleaning.

The intriguing caveat of uniform flow is that when a substance can be separated only in a narrow range of parameters, the uniform device can be uniformly wrong as readily as uniformly correct.

Due to the fact that the cross-flow filtration devices disclosed in the aforementioned Kopf patents and preferably used in the practice of the present invention are relatively new and less widely utilized in comparison to cassettes commercially available from Millipore and Pall-Filtron, spiral wound elements commercially available from Koch and Osmonics, and hollow fibers commercially available from Koch-Romicon and A/G Technology, many applications we have encountered were previously attempted with one or more of these prior art cross-flow filter devices.

It has been documented that in the prior art devices, in cases involving permeation of a target substance away from a larger species, such as in isolation and recovery of a secreted protein from cell culture fluid, the higher the passage of protein encountered on the prior art device the easier the separation.

In other words, when the protein rejection of the prior art, hollow fiber, cassette or spiral cross-flow module is fifty percent (50%), roughly half of the various conditions in the prior art device are appropriate for separation. Given the non-uniform flow distribution of the prior art devices, this correlates with the fact that the target substance can be separated from the larger substances by numerous operating parameters. Accordingly, the separation would be deemed easy. In contrast, a separation in which the protein rejection of the prior art hollow fiber, cassette or spiral cross flow module is ten percent (10%) correspondingly means that less than ten percent of the various conditions inside the prior art device are appropriate for separation. Given the non-uniform flow distribution of the prior art devices, this correlates to the fact that the target substance can be separated from the larger substances only under highly specific conditions, and the separation therefore is deemed a difficult separation.

Selecting a channel height can be performed mathematically or empirically by trial and error. In most cell fermentation applications, trial and error has been more appropriate due to the fact that the viscosity of the cell broth or product solution is rarely known, the cell count and cell viability are highly variable, and the solution is frequently non-Newtowian. The objective of channel selection is to minimize channel height with three critical stipulations: first, the channel must be sufficiently high to allow the unrestricted passage of any larger material such as clumped cells; second, the channel should not cause excessive pressure drop and loss of linear efficiency; and third, the channel should be sufficiently high as to allow the proper angle of attack for substances to encounter the membrane pore and pass through the pore. The optimal channel height is dependent on the length and viscosity of the solution.

Several notable observations have been made in initial trials and process scale-up, as discussed below.

For cell suspensions having an optical density (OD) of 2 to 500, and a path length of 6 to 12 inches, start with a channel height between 0.4 to 0.75 mm. If the inlet pressure is above 15 PSIG at a velocity of 2.0 M/sec, then the channel is too thin.

For cell suspensions having an optical density (OD) of 2 to 500, and a path length of 6 to 12 inches, start with a channel height between 0.4 to 0.75 mm. If the inlet pressure is below 5 PSIG at a velocity of 2.0 M/sec the channel is too high.

For cell suspensions having an optical density (OD) of 2 to 500, and a path length of 25 to 40 inches, start with a channel height between 0.7 to 1.0 mm. If the inlet pressure is above 15 PSIG at a velocity of 2.0 M/sec, the channel is too thin.

For cell suspensions having an optical density (OD) of 2 to 500, and a path length of 25 to 40 inches, start with a channel height between 0.7 to 1.0 mm. If the inlet pressure is below 5 PSIG at a velocity of 2.0 M/sec, the channel is too high.

For non-particulate-containing fluids such as protein solutions having a concentration of 1 to 20 percent by weight, and a path length of 6 to 12 inches, start with a channel height between 0.2 to 0.5 mm. If the inlet pressure is above 15 PSIG at a velocity of 3.0 M/sec, the channel is too thin.

For non-particulate-containing fluids such as protein solutions having a concentration of 1 to 20 percent by weight, and a path length of 6 to 12 inches, start with a channel height between 0.2 to 0.5 mm. If the inlet pressure is below 5 PSIG at a velocity of 3.0 M/sec, the channel is too high.

For non-particulate containing fluids such as protein solutions having a concentration of 1 to 20 percent by weight, and a path length of 25 to 40 inches, start with a channel height between 0.4 to 1.0 mm. If the inlet pressure is above 15 PSIG at a velocity of 3.0 M/sec, the channel is too thin.

For non-particulate containing fluids such as protein solutions having a concentration of 1 to 20 percent by weight, and a path length of 25 to 40 inches, start with a channel height between 0.4 to 1.0 mm. If the inlet pressure is below 5 PSIG at a velocity of 3.0 M/sec, the channel is too high.

Shear at the surface of the membrane is critical in minimizing gel layer formation, but excess shear is deleterious in at least three key aspects: first, it increases energy consumption costs; second, excess shear and the resulting pressure has been demonstrated to interfere with separations which appear to be based on diffusion at the membrane surface; and third, shear can result in damage to cells and impairment of the bioactivity of certain compounds.

It is apparent that the benefits of shear are readily observed within a specific range for each process and that shear rates outside that range are highly destructive.

Before progressing in the explication of the optimization process, it must be pointed out that the shear stability of the substances in solution or suspension, is a key element in shear optimization. Only through accurately calculating and charting the specific shear rates utilized during optimization can the true benefits of shear optimization become apparent. In protein concentration processes, it is graphically clear that the higher the shear, the higher the membrane flux, with two striking observations.

First, there is a minimum shear value that minimizes the gel-layer formation. This minimum shear can be best demonstrated for any specific solution by first running the device at an excessively high shear rate and then systematically lowering the shear incrementally until the resultant flux decay of each incremental reduction in shear is disproportional to the reduction in shear. Given the repeated observation during cross-flow concentration applications that increasing the shear increases the flux, the maximum flux for solutions is clearly governed by the law of diminishing returns, where at some point increases in shear provide lower increases in flux.

For concentration applications, it can be stated that there is a minimum shear required to keep the membrane clean through minimizing the gel-layer formation, as well as a maximum shear which is determined by the cost of energy required to marginally increase flux.

For separation applications it can be stated that there is a minimum shear required to minimize the gel-layer formation and allow the passage of a target substance, as well as a maximum shear that interferes with the passage of a target substance, even though the higher shear results in higher water flux rates.

Furthermore, it is possible to develop processes based on channel velocity, given that most cross-flow end users tend to work with a single channel height based on past experiences, and the predominance of cross-flow modules that are only available in a single channel height.

When working with a single device of uniform height, shear is directly proportional to channel velocity for the same solution. In concentration applications, the end user should install a flow meter on the permeate port and record the maximum flux obtained at reasonable cross-flow velocities between 1 and 4 M/sec for devices with channel heights between 0.5 mm and 1.0 mm. In separation applications, the end user should assay the passage of the target material(s) at cross-flow velocities between 0.5 and 2.5 M/sec for devices with channel heights between 0.5 mm and 1.5 mm. In protein separation applications in particular, the user should:

- design the system piping such that the retentate return line from the cross-flow module creates no back pressure on the membrane;
- select a channel height between 0.5 and 1.5 mm; and
- assay the permeate and retentate simultaneously at channel velocities every 0.1 M/sec between 0.5 and 2.0 M/sec to find the optimum passage (minimum rejection).

It is far more accurate to measure and scale-up membrane performance based on calculating the shear. Shear calculations require the fluid viscosity as well as the hydraulic diameter of the crossflow device being utilized.

The preferred shear rates for different applications are as follows:

- the optimal permeate rate for concentration procedures utilizing ultrafiltration membranes is achieved in the range of 10,000 to 50,000 (/sec), and in most circumstances a shear of 15,000 to 32,000/sec will provide satisfactory results;
- the optimal separation of proteins utilizing membrane with pore structures greater than 0.05 micron is achieved in the range of 3,000 to 30,000 (/sec), and in most circumstances a shear of 4,000 to 16,000/sec will provide satisfactory results;
- the optimum permeate rate for cell concentrations is achieved in the range of 10,000 to 65,000 (/sec), where the larger pore size membranes require the higher shear rates; and
- the shear rate of 32,000/sec often provides excellent results for protein concentrations with membranes from 1,000 to 100,000 daltons.

Given the difficulty for most membrane users to calculate shear rates due to a lack of sufficient information regarding the hydraulic diameter of various devices, using velocity calculations will be sufficient for process optimization and scale-up when a single channel height is utilized.

Flat Sheet Devices:

Velocity (cm/sec)=Volumetric Flow Rate ($LPM$) divided by Channel hydraulic diameter (cm)×Number of Channels×60×0.001

$V$ (cm/sec)=$LPM/D_H$×Number of Channels×60×0.001

$V$ Meter/sec=$V$ (cm/sec)/100

Hollow Fibers:

Velocity (cm/sec)=Volumetric Flow Rate ($LPM$) divided by Fiber hydraulic diameter (cm$^2$)×Number of Fibers×60×0.001

$V$ (cm/sec)=$LPM/D_H$ (cm)×Number of Fibers×60×0.001

$V$ M/sec=$V$ cm/sec/100

Volumetric Flow Rate Calculations

Flat Sheet Devices:

Volumetric Flow Rate ($LPM$)=Channel hydraulic diameter (cm)×Number of Channnels×Velocity (cm/sec)×60×0.001

$LPM=D_H$×Number of Channels×$V$ (cm/sec)×60×0.001

$GPM=LPM/3.785$

Hollow Fibers:

Volumetric Flow Rate ($LPM$)=Fiber hydraulic diameter (cm)×Number of Fibers×Velocity (cm/sec)×60×0.001

$LPM=D_H$ (cm)×Number of Fibers×$V$ (cm/sec) 60×0.001

$GPM=LPM/3.785$

The optimization of transmembrane pressure (TMP) can only be performed after the appropriate tangential velocity has been determined. Transmembrane pressure is calculated as TMP=(inlet pressure+outlet pressure)/2−permeate pressure. It is imperative that the tangential velocity (flow rate) be monitored during the optimization of transmembrane pressure, since increasing the pressure normally decreases the output of most pumps due to slippage. The objective of the optimization of transmembrane pressure is to define the correlation of transmembrane pressure to permeate flow rate. The normal relationship is a traditional bell curve. A graph of transmembrane pressure versus permeate flow rate should resemble a bell curve. Increases in transmembrane pressure cause increases in the permeate rate until a maximum is reached, and thereafter further increases in transmembrane pressure result in decreases in the permeate rate. The reason for this result is that the decreasing flow rate, resulting from higher transmembrane pressures, is the result of gel layer and/or membrane compression.

The procedure is set out below:

(1) Operate the system in total recycle mode at the optimum tangential velocity for sufficient time, typically fifteen minutes, for any gel layer to accumulate.

(2) Measure the permeate rate. This is the Base Rate.

(3) Increase the transmembrane pressure by 3 PSIG and measure the permeate rate immediately and after five minutes at the new transmembrane pressure. Compare the permeate rates to the base rate. If the rates have increased go to Step 4. If the rate decreases go to step 5.

(4) Repeat steps 2 and 3 until the permeate rate no longer increases during each step or does not hold that increase for five minutes.

(5) The optimum transmembrane pressure is the last pressure reading where the increase in pressure result in an increase in permeate rate.

In separation applications, the end user should assay the passage of the target material(s) at TMP's between 2 and 15 PSIG where the cross-flow velocity is optimized between 0.5 and 2.5 M/sec for devices with channel heights between 0.5 mm and 1.5 mm.

In protein separation applications in particular, the user should follow the procedure set out below:

- design the system piping such that the retentate return line from the cross-flow module creates no back pressure on the membrane;
- from optimization of shear section above, select a channel height between 0.5 and 1.5 mm;

the channel velocities should be between 0.5 and 2.0 M/sec;

increase the TMP by closing the backpressure valve such that the TMP increaes in one pound increments; and sample the retentae and permeate simultaneously at each one-pound increment of TMP to find the optimum passage (minimum retention) of the target substance.

Selecting and optimizing the channel length has been totally impractical if not an impossible task until the advent of the current invention. The inherent difficulty of optimizing the channel length in prior art devices has been three-fold: first, the devices such as spirals were designed to maximize membrane utilization based on the width that membranes could be cast rather than any other factor; second, increases in channel length for devices such as cassettes resulted in enormous increases in pressure drop due to the predetermined channel geometry imposed by the retentate screen; and third, plate and frame devices, such as for example Pleidae by Rhodia, France, use fixed molded plates which are manufactured in a single length and cannot be changed without manufacturing a new mold.

The present invention eliminates these prior art restrictions by providing the ability to select the channel length by utilization of an infinitely variable retentate sheet that is cut to length from an appropriately manufactured film, selected from a variety of standard or starting point thicknesses. Likewise, the membrane sheets and permeate sheets are cut to matching lengths and laminated into a stacked cassette.

There undoubtedly are many ways of selecting the optimum membrane for any given process, yet it appears the most reliable method of using membranes is to consider the manufacturer's specified pore size as a theoretical starting point which then is modified by the solution and the operating conditions. As a result of numerous trials, we have developed a practical parameter that we have termed the coefficient of rejection.

Coefficient of Rejection (CRV)

Membranes have a rejection characteristic (value) that is first order and is defined by the size, charge and shape of the pore. For simplicity the CRV, coefficient of rejection value, is the stated pore size provided by the manufacturer. In purifying a product of interest the CRV of a membrane is more important for separation applications as compared to concentration applications. The rules below specifically relate to separation applications. These effects will vary in concentration applications.

The CRV of a membrane is subject to the velocity of the tangential flow operation. Empirical evidence suggests that the neutral point of any membrane can occur in two zones, the first zone being the point at which the transmembrane pressure and/or shear compress the gel layer and the CRV increases, and the second zone occurring where the TMP and velocity minimize the shear and the CRV decreases. The neutral point (NP) is defined as the point where a membrane freely passes particles 0.5 times the stated pore size, NP=0.5 (Pore Size).

Therefore:

the effective CRV of a typical micro porous membrane is greater than the pore size, for velocities greater than 1.5 M/sec and less than 3.0 M/sec.; and the effective CRV of a typical ultrafiltration membrane is greater than the pore size, for velocities greater than 1.5 and less than 3.0 M/sec.

Example: A $0.3\mu$ particle may freely pass a $0.45\mu$ polymeric membrane when the velocity is between 1.5 and 4.0 M/sec but not for velocities between 0.5 and 1.5 M/sec or 4.5 and 12 M/sec.

Example: A 45,000 MW protein may freely pass a $0.2\mu$ membrane for velocities of 0 to 1.0 M/sec but be significantly retained when the velocity is increased above 1.5 M/sec. In the same experiment, it was documented that protein passage was above 90% for velocities between 0.8 and 1.5 M/sec and 25% for a velocity of 2.0 M/sec. Additionally, this same protein had 65% membrane transmission through a 100,000 MW membrane at velocity of 1.0 M/sec.

Further:

the CRV of a membrane is proportional to the molarity of the solution;

the greater the solute concentration, the greater the CRV; and the lower the solute concentration, the smaller the CRV.

Example: A membrane may have a stated pore size of 500,000 MW but will retain proteins of 110,000 MW in cell suspension with an OD over 100 and pass the same 110,000 MW protein when the OD is less than 50.

A more detailed understanding of how concentration affects the CRV of a membrane will be gained from the following three additional examples.

Example: During experiments passing whey proteins such as Lactoferrin, α-lactalbumin and β-lactoglobulin away from casein using a BTS100 membrane, USF Filtration, San Diego, Calif., when installed in a North Carolina SRT, Inc. cross flow filtration module, it was observed that the milk source could first be concentrated using a tight ultrafilter prior to the BTS100 for improved protein passage through the BTS100, inasmuch as the CRV for the whey proteins was significantly low. A commercial application of this observation would be that milk could be first concentrated by any suitable means such as membrane filtration and/or evaporation, and the concentrate or some portion thereof could then be processed by a BTS100 membrane module, or a suitable alternative membrane, for improved whey protein harvest. In these same experiments, it was noted that the optimal velocity was between 0.8 and 1.5 M/sec for the optimal protein passage.

Example: When separating an excreted target protein from a cell culture or an intracellular protein from a cell lysate by cross-flow microfiltration, the concentration of the cells or cell debris invariably prevents the passage of the target protein into the permeate, even though the protein freely passes through the membrane in the earlier part of the process. This fact does not prevent the use of cross-flow microfiltration, but rather determines it specific application. First, rather than merely concentrate the cell or cellular debris, the investigator can set the velocity at 1.0 M/sec and monitor the CRV of the membrane, assaying the passage of the target protein at set volumetric increments into the permeate during concentration, and beginning diafiltration of the target protein at the point just prior to the CRV of the membrane preventing the passage of the target protein.

Example: A preferred method for recovering an excreted target protein from a cell culture or an intracellular protein from a cell lysate is to perform two filtrations simultaneously. In the first filtration, the cells or cellular debris is continuously diafiltered utilizing the membrane with the tightest pore size which passes the target protein. The second filtration concentrates the target protein utilizing the most open pore size that concentrates the target protein. An optional adjunct to this process is to utilize the permeate of the second filter to be the diafiltrate of the first filter. This process results in the highest yield and lowest cost as compared to alternative membrane and centrifugation procedures, by eliminating the large tank normally required to collect the permeate of the first filter and the cost of the diafiltrate solution. This method is enormously useful for performing any number of separations, including, without limitation, milk, juice, wastewater, bacteria, mammalian cells, virus, viral particles, antigens, antibodies, and plant and tissue extracts.

Additionally:
the CRV of a membrane for a given species is minimized at the isoelectric point of the species.

Example: Albumin is readily retained by membranes as large as 200 kD at a pH of 7.4, and albumin freely passes membranes as small as 100 kD at a pH of 4.8.

Further:
the CRV of a membrane for a given species can be minimized by utilization of salt concentrations that dissociate the species of interest from other solutes.

Example: Pasteurella and Pneumoccal cell wall fragments (polysaccharide vaccines) are readily separated from whole cells in the presence of high NaCl concentrations that dissociate the polysaccharide from the cell wall. Fibrinogen readily passes 0.6μ membranes in the presence of sodium citrate, which prevents clotting and fibrinogen cross-linking.

Still further:
the CRV value of a membrane is directly affected by the binding properties of the polymer; as simple as this sounds, the particular benefits associated with any single membrane polymer, such as low binding membranes, are far from clear; we have encountered various applications where membranes had CRV values that were 0.1× the manufacturer's stated pore size.

Example: Sialyllactose can be isolated from both milk and whey by first separating the sialyllactose from the whey proteins with a low surface charge membrane such as regenerated cellulose and then concentrating the sialyllactose away from the lactose with a high surface charge polyethersulfone membrane.

Additionally:
the CRV of a membrane for a given species can be minimized by utilization of a temperature that dissociates the species of interest from other solutes.

Example: Lactoferrin will pass a BTS100 membrane, USF Filtration, San Diego, Calif., when installed in a North Carolina SRT, Inc. cross-flow filtration module between the temperatures of 10 and 15 degrees Centigrade, but is retained by the membrane above this range at the prescribed velocities in the experiments.

The role of temperature as demonstrated in the example cited above is also critical in both concentration and separation. It is conventional wisdom that increases in temperature produce increased permeate rates of many solutions. In our experiments, we have discovered that changes in temperature can produce several additional, heretofore-undocumented results.

Further:
changing the temperature of a solution changes properties within the membrane/solution profile such that the retention and/or passage of a given species is changed.

Example: Lactoferrin will pass a BTS100 membrane, USF Filtration, San Diego, Calif., when installed in a North Carolina SRT, Inc. cross-flow filtration module between the temperatures of 10 and 15 degrees Centigrade but is retained by the membrane above this range at the prescribed velocities in the experiments.

Still further:
changing the temperature of a solution changes the rejection characteristics of a membrane.

Example: Increasing the temperature of milk during processing with a BTS100 membrane, USF Filtration, San Diego, Calif., when installed in a North Carolina SRT, Inc. cross-flow filtration module increases the permeate rate and the total protein passage into the permeate.

In addition to the foregoing:
changing the temperature of a solution changes properties within the membrane/solution profile such that the retention and/or passage of a given species can change with respect to its proportion to other species in the solution.

Example: Increasing the temperature of milk during processing with a BTS100 membrane, USF Filtration, San Diego, Calif., when installed in a North Carolina SRT, Inc. cross-flow filtration module increases the total protein passage but it also changes the proportion of α-lactalbumin to β-lactoglobulin in the permeate.

Therefore, with respect to perfecting any separation process with regard to temperature, it is advisable to vary the temperature between 4° C. and 60° C. where appropriate, and to measure changes in permeate flux rate, total solute passage and the proportions of the solute passing through the membrane.

There are multiple practical applications and benefits inherent in varying the channel height and length of a filter module, in modules of such type as are described in the U.S. patents issued to Henry B. Kopf, as discussed hereinabove, and incorporated herein by reference in their respective entireties, and in modules described in Henry Kopf III's co-pending U.S. patent application Ser. No. 09/818,823 filed Mar. 27, 2001 for "INTEGRAL GASKETED FILTRATION CASSETTE ARTICLE AND METHOD OF MAKING THE SAME" and incorporated herein by reference in its entirety. A significant benefit is the optimization of shear and pressure drop within a single filter module and/or process. In addition, this same optimization protocol is beneficial to each filter module in a multistage or multi-step process, in which each filter can and should be optimized individually, and aggregately as a part of the entire system.

Example: In a two step process such as recovering a target protein excreted by a genetically engineered cell line, it is advantageous to vary the channel lengths and channel heights. In the first step, a microporous membrane filter would be optimal with a 0.875 mm channel and a path length equivalent to the SEPTOPORT™ Filter Module, commercially available from North Carolina SRT, Inc., Cary N.C. In the second step, an ultrafiltration membrane using a lower 0.75 mm channel height and a longer path length equivalent to the ECON™ Filter Module commercially available from North Carolina SRT, Inc., Cary N.C., would be optimal.

Specifically, the first step is optimized for a viscous cell clarification requiring a relatively higher channel and short path length, and the second step is optimized for concentrating a dilute protein excreted by the cell into the culture media, which is more optimally performed with a lower channel height, higher shear, and a longer path length due to the lower viscosity.

Example: In a multistage system such as a large scale dairy system employed to separate whey proteins from casein in milk, it is advantageous to utilize a filter module of higher channel height of the same length, or a filter module of the same channel height in a shorter channel length in the latter stage filter modules, to adjust for the increase in viscosity as the casein concentration increases. In this example, it is appropriate to note that the deciding factor, between lowering or raising the channel height, or lengthening or shortening the path lengths of the modules to respectively increase or decrease shear and/or raise or lower pressure drop, follows the guidelines set forth above for operating a single filter module or a single step process.

The clear advantage to the end user is that the dimensional criteria and algorithmic approaches discussed hereinabove, in application to the filtration modules disclosed in the aforementioned U.S. patents of Henry B. Kopf and the pending U.S. patent application of Henry Kopf III, provides the method and equipment necessary for selection and optimization of the most efficient channel height and length for individual filter modules, as well as each filter module within multi-stage or multi-step systems.

The disclosures herein are directed to illustrative methods and equipment useful in the separation of liquids, gases, and mixtures and suspensions of various liquids, gases, solids and solvents, however mixed or suspended. It also is intended that the equipment and methods of the invention be broadly used and applied for both stand-alone filtration modules, as well as complexes or integrated installations of filtration modules, for any given separation protocol.

The potential uses of the invention in the pharmaceutical, commercial, enzyme production, dietary supplement, vitamin, food, beverage, waste recovery, environmental, neutraceutical and dairy industries are enormous in variety and extent of applications, due to the fact that the process does not alter the natural state of the components, and it also allows the individual components to be utilized separately as well as in combination, in useful formulations of enriched components for specific uses.

Furthermore, the use of equipment and methodology for continuous fermentation of the lactose or sugar stream of any one of the aforementioned separated milk product streams, has potential for further enhancing the economic feasibility of the overall process, as well as lowering the environmental impact of releasing excess lactose and other high bacterial oxygen demand substances into the environment.

By optimizing membrane separation techniques, we have developed an integral separation process for fractioning milk into its various nutritional components, including for example proteins, carbohydrates, and minerals that are essential for normal growth and development of infants and possess important nutritional or therapeutic values for adults.

For example, beta-lactoglobulin has numerous binding sites for minerals (particularly for calcium and zinc), fat-soluble vitamins, and lipids, and can be used to incorporate desirable lipophilic compounds such as tocopherol and vitamin A into low-fat products. Alpha-lactalbumin accounts for 28% of the total protein in human milk, and addition of bovine alpha-lactalbumin is strongly advocated to "humanize" infant formulas and create other products for people with limited or restricted protein intakes.

Immunoglobulins, such as IgG1, IgG2, IgA, and IgM, provide passive immunity to infants as well as adults, and therefore have high therapeutic values. Serum albumin binds fatty acids as well as other small molecules. Glycomacropeptide (GMP), the glycosylated portion of caseinomacropeptide, can suppress appetite via stimulation of the pancreatic hormone cholecystokinin release, making it useful for manufacturing of appetite-suppressant products or diet aids.

Siallyllactose, which is the main siallyated compound in human milk, has inhibitory effects on diarrhea induced by cholera toxin, and therefore is therapeutically valuable in preventing or treating diarrhea.

Isolation and purification of these milk components therefore are important for full utilization of milk or milk-based nutrition sources.

Referring now to the drawings, FIG. 1 is a generalized flow chart demonstrating an integral process of sequential fractionation of milk components.

Feed (which may be milk, or skim milk, whey, or other milk-based fluids) is flowed through cross-flow filtration module 1 to generate a retentate fraction A, which may include bacteria, milk fat, or casein.

The permeate fraction generated by the cross-flow filtration module 1 (passed through the membrane therein) is then flowed through filtration module 2 to form a retentate fraction B, which may include whey protein isolates (WPI) including small particles of milk fat or casein that are not retained by filtration module 1. Alternatively, the retentate fraction B generated by filtration module 2 may include lactoferrin concentrate or immunoglobulin G and albumin concentrate.

The permeate fraction from the cross-flow filtration module 2 subsequently passes through cross-flow filtration module 3 and forms a retentate fraction C and D, which may be the mixture of $\beta$-lactoglobulin and $\alpha$-lactalbumin. Retentate fraction C and D can be further separated by another filtration module 4 to form isolated fraction C (which may be $\beta$-lactoglobulin) and D (which may be $\alpha$-lactalbumin).

In one specific embodiment of the present invention, the retentate fraction B (which contains whey protein isolates) generated, i.e., formed by membrane filtration, by filtration module 2 can be added into the retentate fraction C and D (which contains $\beta$-lactoglobulin and $\alpha$-lactalbumin) from filtration module 3, so as to form $\beta$-lactoglobulin and $\alpha$-lactalbumin-enriched whey protein isolates, as a novel nutrition product.

The permeate fraction generated by the cross-filtration module 3 then is passed downstream through filtration module 5. A retentate fraction E is formed by filtration module 5, and this retentate fraction may contain complex carbohydrates such as 3' and 6' sialyllactose.

The permeate fraction generated by filtration module 5 then can be passed through filtration module 6, which generates a retentate fraction F containing lactose, and a permeate fraction constituted mainly of water. The water generated by filtration module 6 can be recycled for purpose of cleaning upstream filtration modules, as shown by the arrow heads with dashed lines.

The lactose-enriched retentate F of filtration module 6 can be further subjected to a fermentation process and then passed through a bioreactor membrane device 7, to form a retentate fraction G that can be used as an animal feed. The permeate fraction from the bioreactor membrane device 7 can then be fractionated by another membrane device 8 to concentrate secreted substances H from the cell mass of bioreactor device 7, providing a clean lactic acid fraction. Alternatively, as shown by the dotted lines, membrane device 8 could be utilized to further concentrate the cell mass from bioreactor device 7 and produce a cell-free permeate of commercial value.

Figure 2:
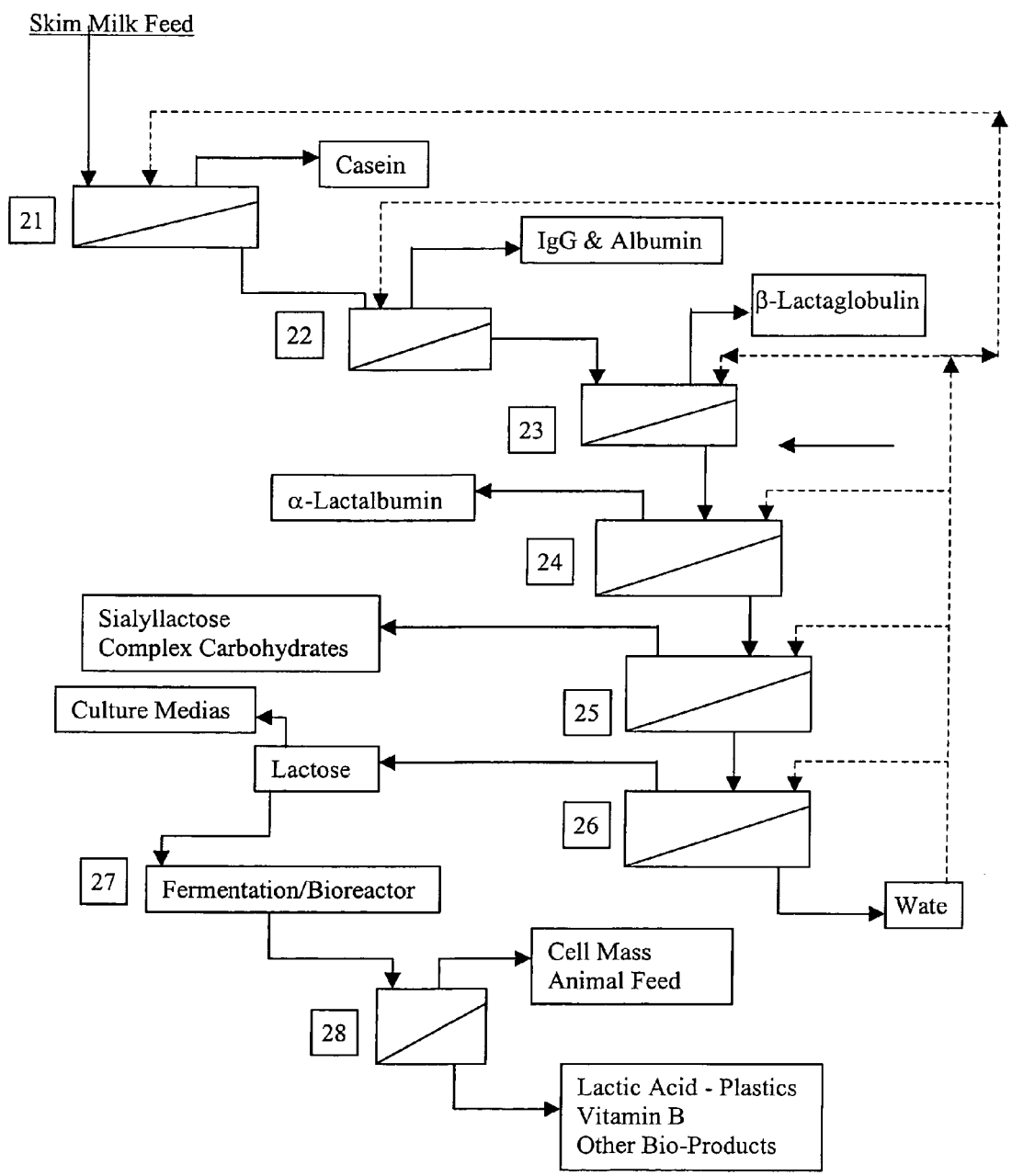
FIG. 2 is a flow chart illustrating a process for sequential fractionation of milk components from skim milk, and subsequent utilization of the fractioned milk components.

FIG. 2 shows a separation process for fractionating skim milk, according to one embodiment of the present invention.

The skim milk feed, from which the fatty component of milk (i.e. milk fat and lipids) has been removed, is flowed through filtration module 21 to form a casein-rich retentate fraction and a casein-depleted permeate fraction. The separation of casein from the other components of milk can be effectuated by incorporating into the filtration module 21 a filtration membrane of average pore size in a range of from about 100 KD to about 3000 KD.

The filtration membrane can be cellulose-based, polymer-based, or ceramic-based. Preferably, such filtration membrane is cellulose-based and comprises a suitable cellulosic membrane material, such as for example, cellulose, cellulose acetate, or regenerated cellulose. It is especially preferred that such filtration membrane be a regenerated cellulose membrane having an average pore size in a range of from about 100 KD to about 1,000 KD. The filtration membrane for separating casein alternatively can be characterized by retentate molecular weight within a range of from about 100,000 to about 3,000,000 MW, or by a bubble point in a range of from about 65 to about 120 psig, preferably from about 80 to about 100 psig. In one specific embodiment of the present invention, a BTS 100 membrane manufactured by U.S. Filters (San Diego, Calif.) is used. The BTS 100 membrane is a polymeric membrane having a bubble point of 100 psig.

The casein-depleted permeate fraction generated by filtration module 21 then is passed through another filtration module 22 to form a retentate fraction that is enriched with immunoglobulin G (IgG) and albumin, and a permeate fraction that is depleted of albumin and IgG. The separation of albumin and IgG from the other components of milk can be effectuated by incorporating into the filtration module 22 a polymeric or cellulosic filtration membrane having retentate molecular weight with a range of from about 50,000 to about 300,000 MW. The RC 100 membrane manufactured by Nadir Filtration GmbH (Wiesbaden, Germany) is particularly useful for the purpose of separating IgG and albumin from casein-depleted whey.

The permeate fraction from filtration module 22, which is depleted of IgG and albumin, then can be flowed from filtration module 22 through a cross-flow filtration module 23 for the purpose of separating β-lactoglobulin from other components in such permeate fraction. A cellulosic filtration membrane having retentate molecular weight within the range from about 10,000 to about 50,000 MW can be incorporated into filtration module 23. In a preferred embodiment, an RC 30 membrane manufactured by Nadir Filtration GmbH (Wiesbaden, Germany) is used for separation of β-lactoglobulin.

The permeate fraction from filtration module 23 is depleted of β-lactoglobulin. It can be subsequently used to produce α-lactalbumin, by passing such permeate fraction through a filtration module 24 that incorporates a polymeric or cellulosic filtration membrane having a retentate molecular weight within a range of from about 1,000 to about 20,000 MW. Preferably, filtration module 24 contains a cellulosic membrane having a retentate molecular weight of about 5,000 MW. More preferably, an RC 5 membrane manufactured by Nadir Filtration GmbH (Wiesbaden, Germany) is used for separation of α-lactalbumin.

Filtration module 24 generates an α-lactalbumin-depleted permeate, which can be subsequently flowed through filtration module 25 for separation of complex carbohydrates such as sialyllactose (SL). Filtration module 25 comprises a polymeric membrane having a retentate molecular weight within a range of from about 500 to about 10,000 MW, which forms a sialyllactose-rich retentate and a sialyllactose-depleted permeate. The filtration membrane incorporated in filtration module 25 preferably is characterized by a retentate molecular weight within a range of from about 800 to about 5,000 MW, more preferably from about 1,000 to about 3,500 MW, and most preferably from about 1,000 to about 3,000 MW. PES 2.5 kD membranes manufactured by Osmonics Co. (Minnetonka, Minn.) are particularly useful for isolating and separating sialyllactose.

The sialyllactose-depleted permeate from filtration module 25 comprises mainly simple carbohydrates, such as lactose, and water. Lactose (i.e., milk sugar) accounts for 63-75% by weight of dry whey powder and is a valuable nutrition source. It therefore is desirable to further isolate and purify lactose from water for further uses, by using an additional filtration module 26 that incorporates a polymeric or cellulosic reverse osmosis membrane. Such reverse osmosis membrane preferably is characterized by a NaCl rejection rate of 80% or greater, and is capable of retaining 98% or greater of the lactose.

The isolated lactose from filtration module 26 can be further used to produce culture media. It can also be subjected to a fermentation process, using a bioreactor membrane device 27 that is characterized by a pore size between about 10,000 MW and about 0.45 micron. The fermented lactose can then be passed through a filtration membrane 28, which forms a retentate fraction, containing cell mass concentrates, and a permeate fraction, containing lactic acid, that can be used to manufacture plastics, vitamin B, and other bioactive products.

Figure 3:
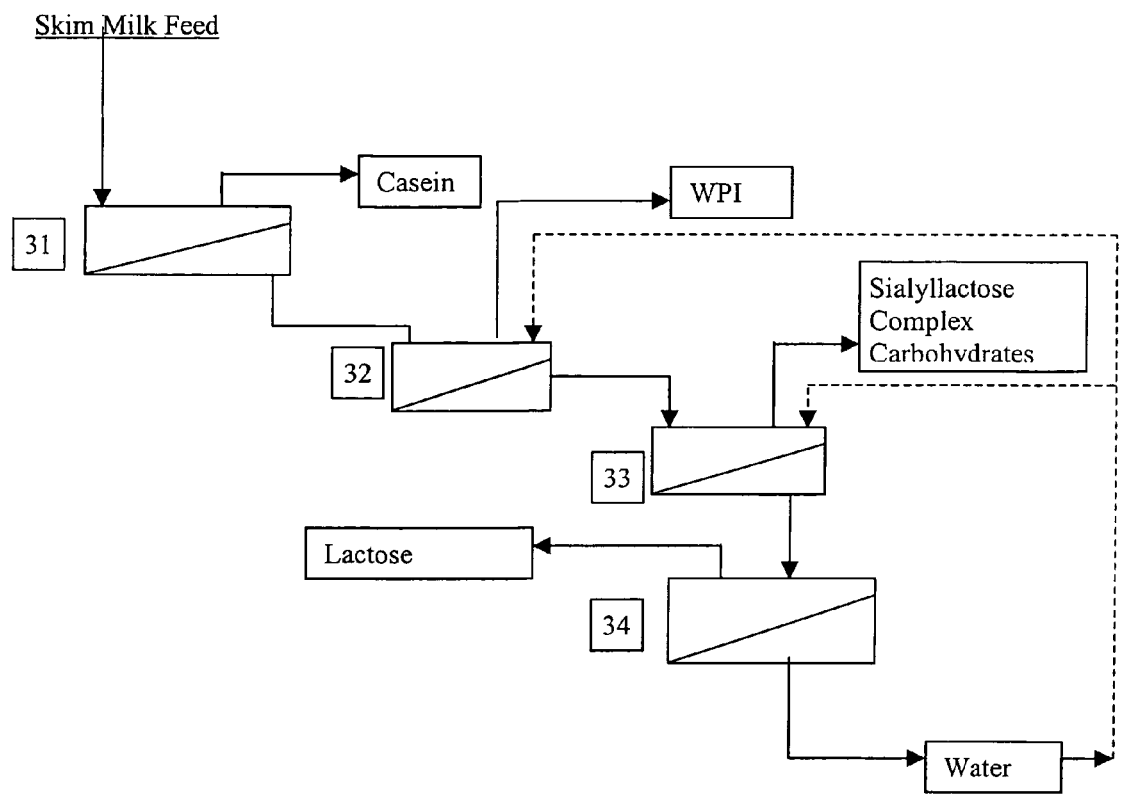
FIG. 3 is a flow chart showing another process for sequential fractional of milk components from skim milk.

FIG. 3 depicts a separation process for fractionating skim milk, according to a different embodiment of the present invention from that of FIG. 2.

The skim milk feed is passed first through filtration module 31 for separation of casein. Permeate from filtration module 31 then is passed through filtration module 32 to form a retentate fraction, including whey protein isolates (WPI) containing IgG, albumin, β-lactoglobulin, α-lactalbumin, etc. Filtration module 32 may comprise a polymeric or cellulosic filtration membrane having retentate molecular weight of from 5,000 to about 40,000 MW, more preferably from about 5,000 to about 20,000 MW, and most preferably about 5,000 MW. An RC 5 membrane manufactured by Nadir Filtration GmbH (Wiesbaden, Germany) is useful for the purpose of separating WPI.

The WPI-depleted permeate fraction from filtration module 32 can be subsequently flowed through filtration modules 33 and 34 for separation of sialyllactose and lactose, respectively.

Figure 4:
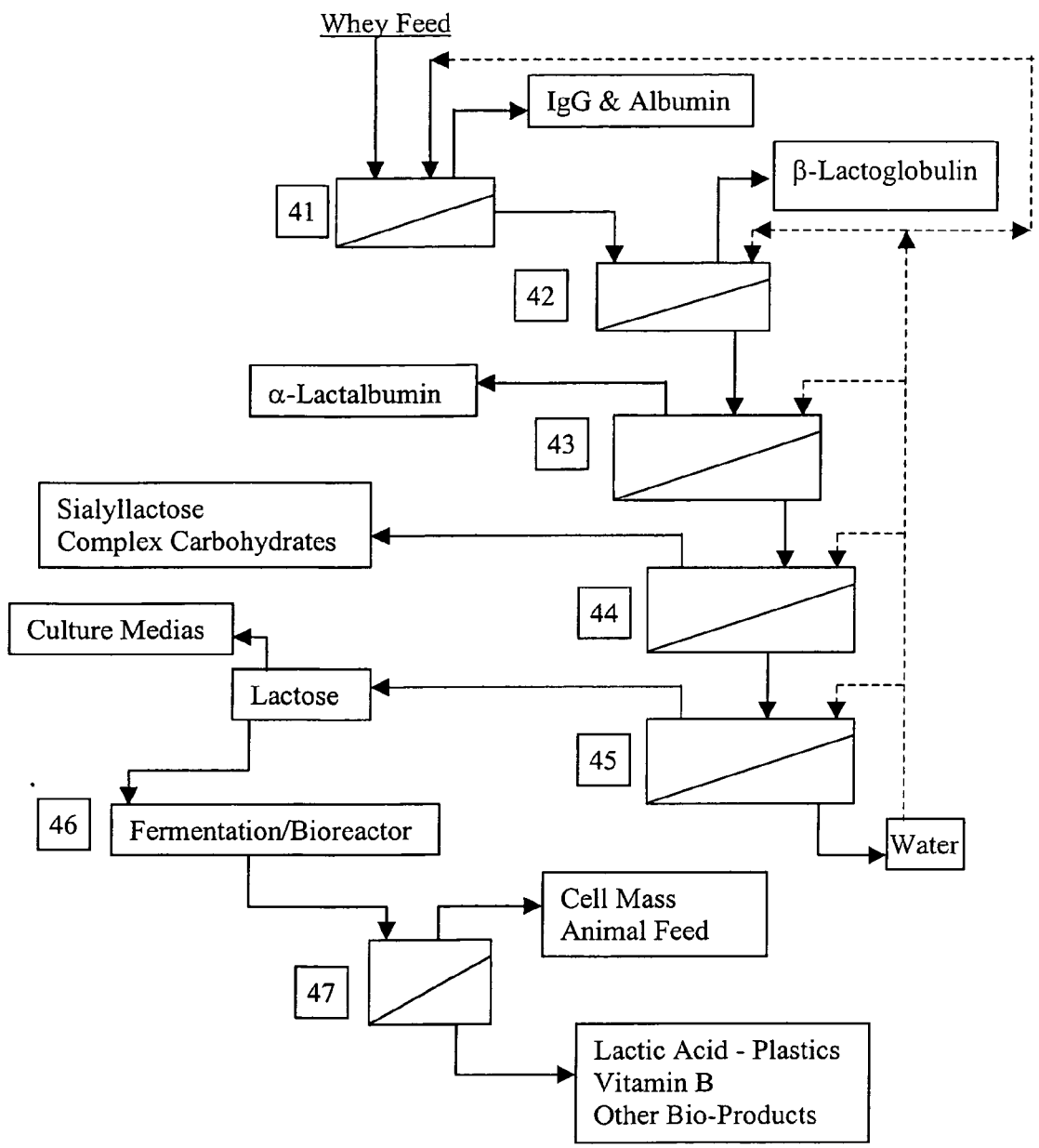
FIG. 4 is a flow chart demonstrating a process for sequential fractionation of whey components from whey, and subsequent utilization of the fractioned whey components.

FIG. 4 is a flow chart for a separation process for fractionating whey that has been depleted of casein. The whey feed is flowed through a first cross-flow filtration module 41 to form a retentate fraction, which is enriched with IgG and albumin, and a permeate fraction that is depleted of IgG and albumin. The retentate fraction that is enriched with IgG and albumin is captured (recovered), while the permeate fraction that is depleted of IgG and albumin is subsequently passed through a second cross-flow filtration module 42, for separation of β-lactoglobulin, and a third cross-flow filtration module 43, for separation of α-lactalbumin.

Permeate from filtration module 43 is depleted of most whey proteins and can be sequentially passed through filtration modules 44 and 45 for separation of sialyllactose and lactose, respectively. The lactose retained by filtration module 45 can then be used to produce culture media, or alternatively it can be subjected to fermentation and filtration processing to produce a cell mass concentration for manufacturing of animal feed, and lactic acid for manufacturing of plastics and vitamin B.

Figure 5:
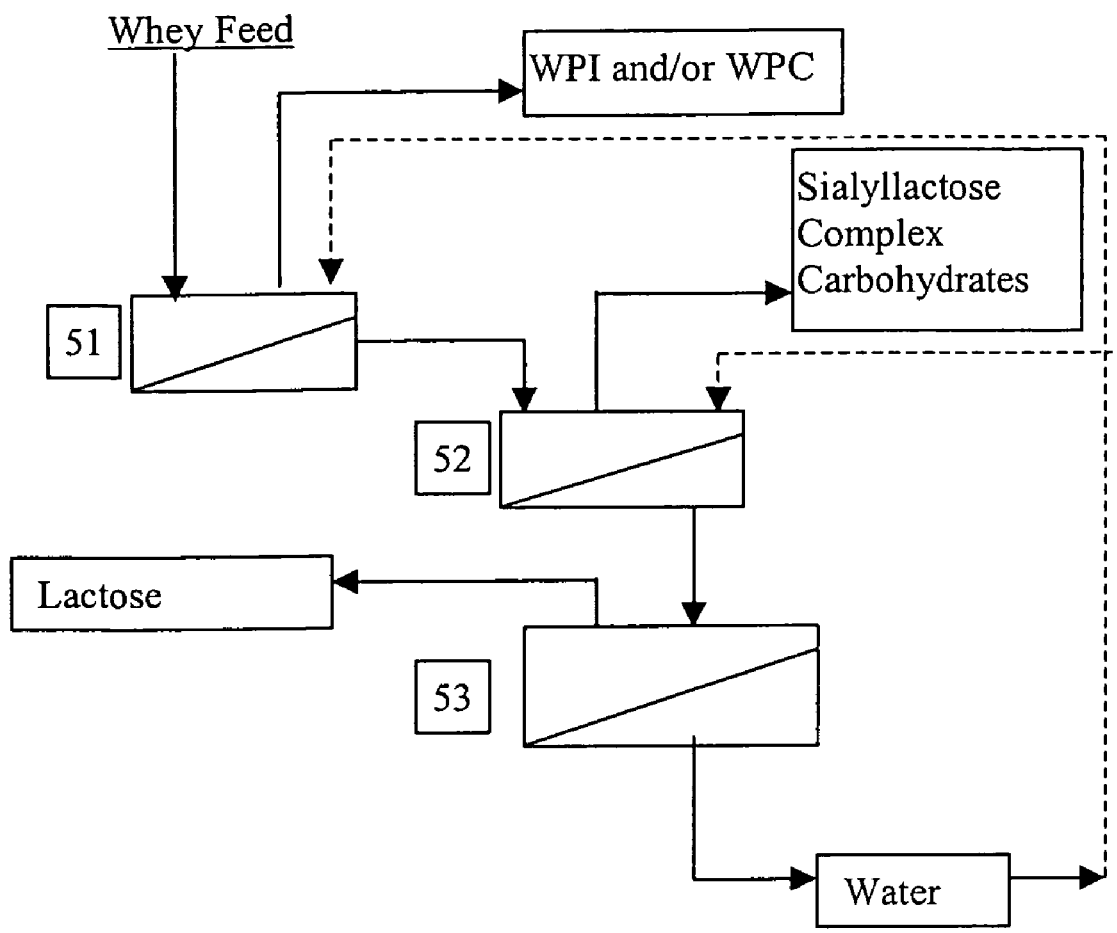
FIG. 5 is a flow chart showing another process for sequential fractionation of whey components form whey.

FIG. 5 illustrates another separation process for fractioning whey into whey protein isolates (WPI) or whey protein concentrates (WPC), sialyllactose, and lactose, using sequentially arranged cross-flow filtration modules 51, 52, and 53.

Figure 6:
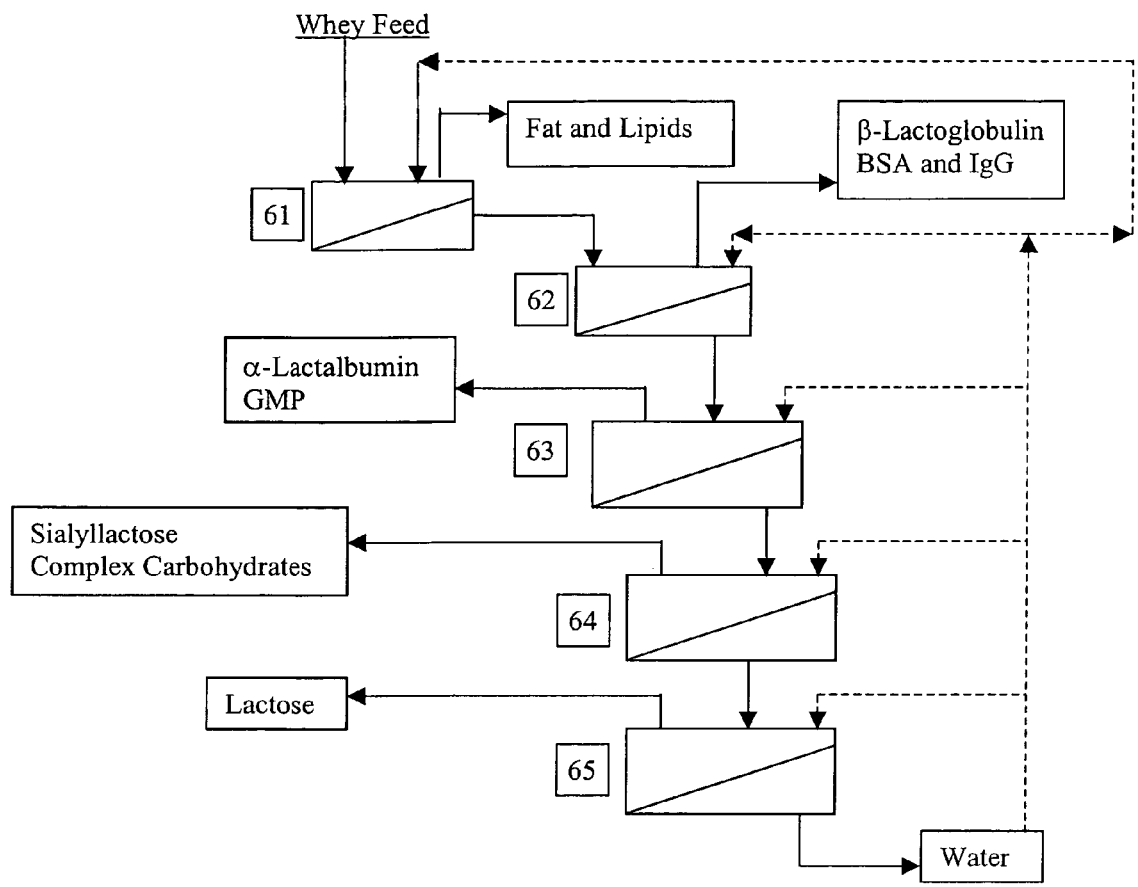
FIG. 6 is a flow chart showing yet another process for sequential fractionation of whey components from whey.

FIG. 6 depicts yet another separation process for fractioning whey. The whey feed is first flowed through a cream separator 61 for removal of fat and lipids therefrom. The cream separator 61 may comprise a polymeric or cellulosic filtration membrane that has a retentate molecular weight within a range of from about 200,000 to about 3,000,000 MW, or a bubble point range of from about 65 to about 120 psig. A preferred filtration membrane for separating fat and liquids is a polymeric membrane having a bubble point of about 80 psig. Commercially available membranes such as BTS 80 manufactured by U.S. Filters (San Diego, Calif.) or RC 100 manufactured by Nadir Filtration GmbH (Wiesbaden, Germany) are most preferred.

Subsequently, the fat free whey from cream separator 61 is flowed through a cross-flow filtration module 62 to form a retentate mixture that includes β-lactoglobulin, bovine serum albumin (BSA), and IgG. Filtration membranes used in filtration module 62 are characterized by a retentate molecular weight in a range of about 20,000 to about 40,000 MW, and preferably are cellulosic membranes having a retentate molecular weight characteristic of about 30,000 MW.

Permeate from filtration module 62 then can be flowed through filtration module 63 for retention of α-lactalbumin and glycomacropeptide (GMP), while filtration module 63 can comprise polymeric or cellulosic filtration membrane having a retentate molecular weight of about 1,000 to about 20,000 MW. The membrane of choice is a cellulosic membrane of retentate molecular weight of about 5,000 MW.

Subsequently, permeate from filtration module 63 can be used to produce sialyllactose and lactose-rich fractions, by sequentially passing such permeate through filtration modules 64 and 65.

Figure 7:
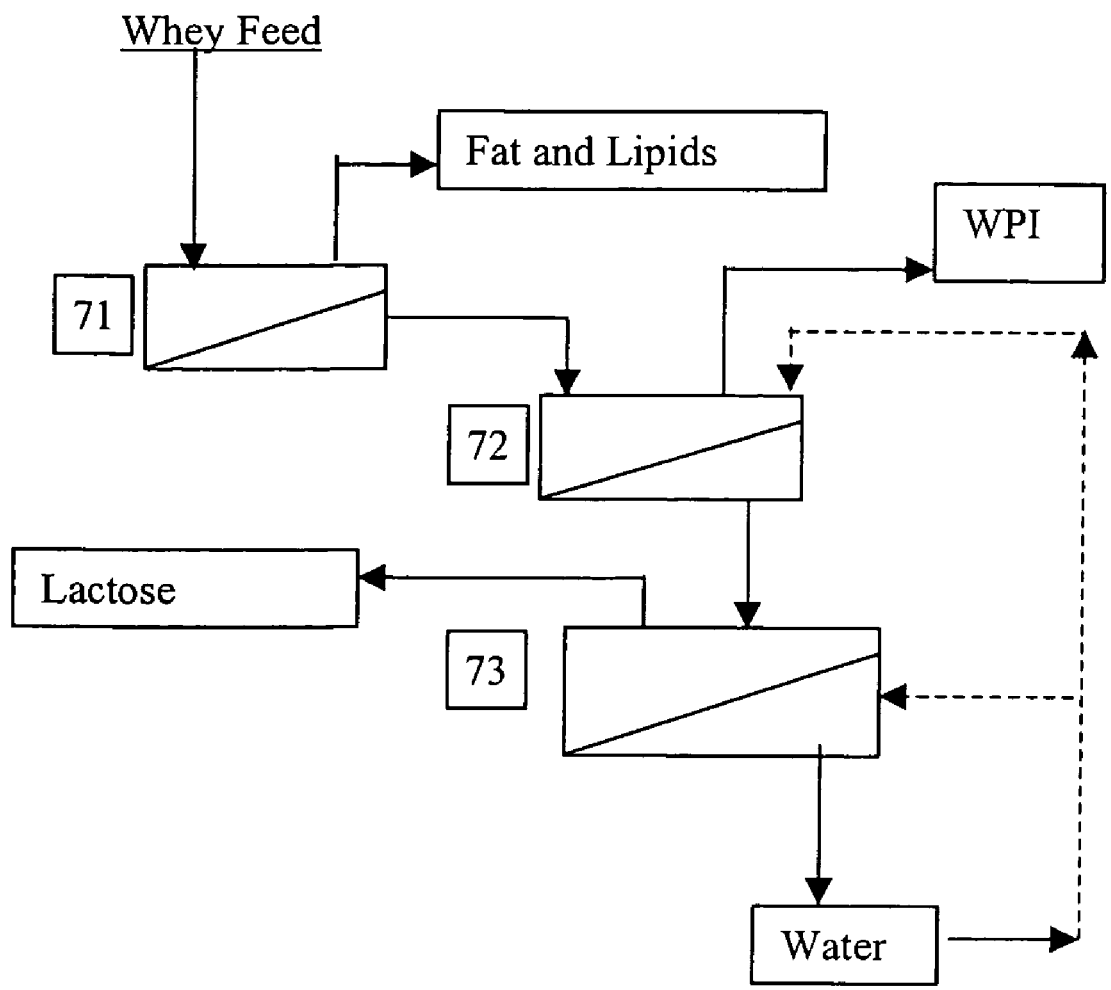
FIG. 7 is a flow chart showing still another process for sequential fractionation of whey components from whey.
Figure 8:
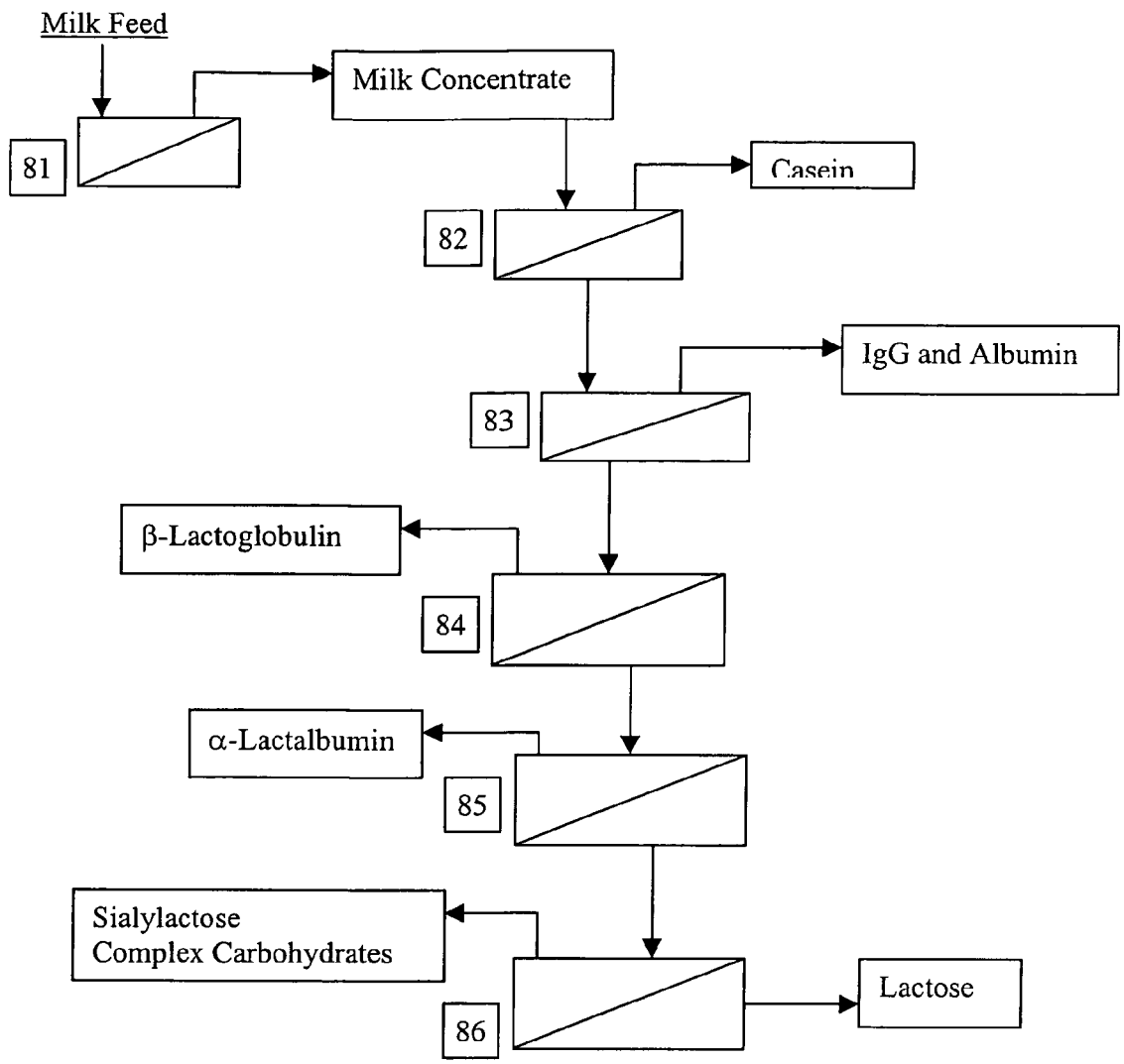
FIG. 8 is a flow chart demonstrating a process for sequential fractionation of milk components from milk.
Figure 9:
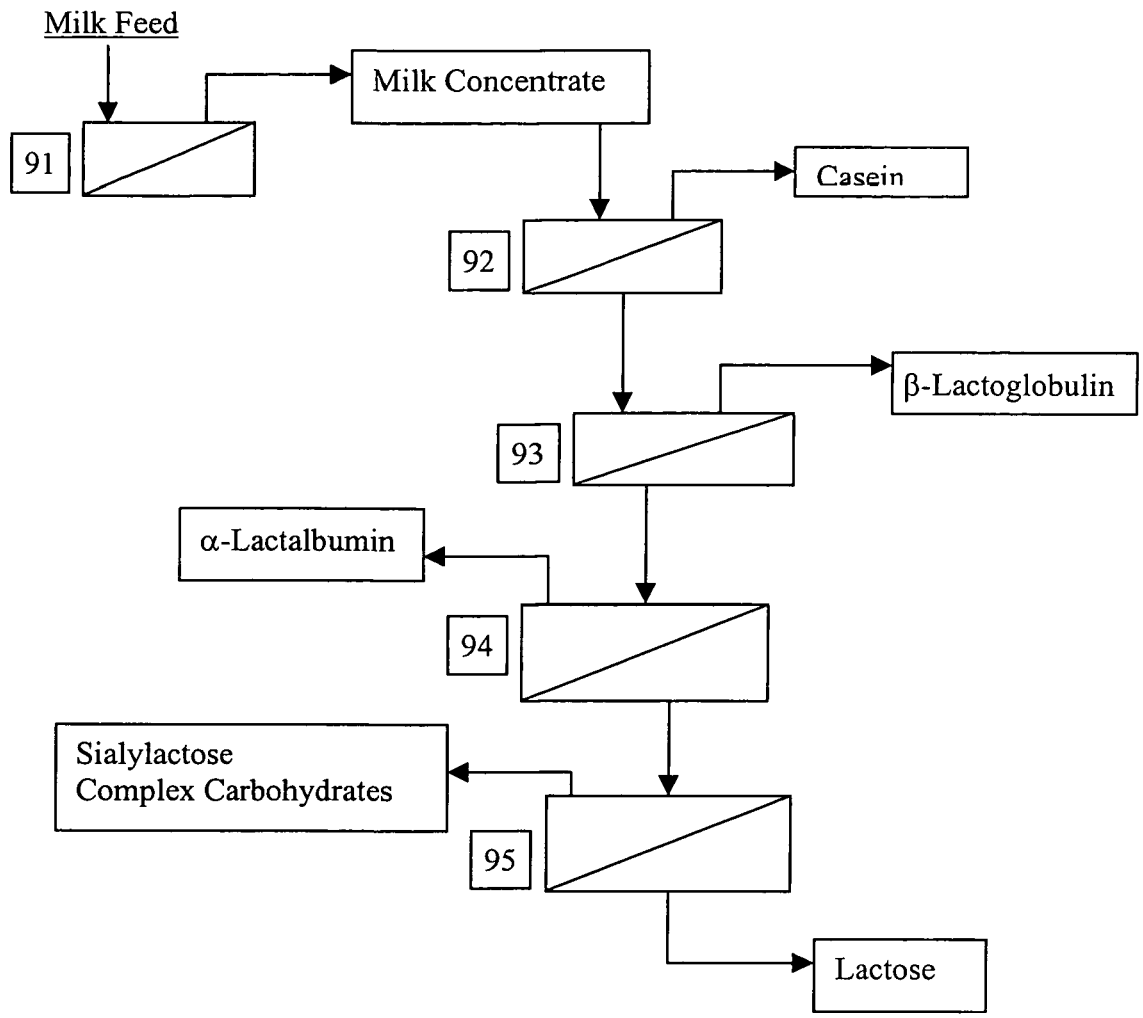
FIG. 9 is a flow chart demonstrating another process for sequential fractionation of milk components from milk.
Figure 10:
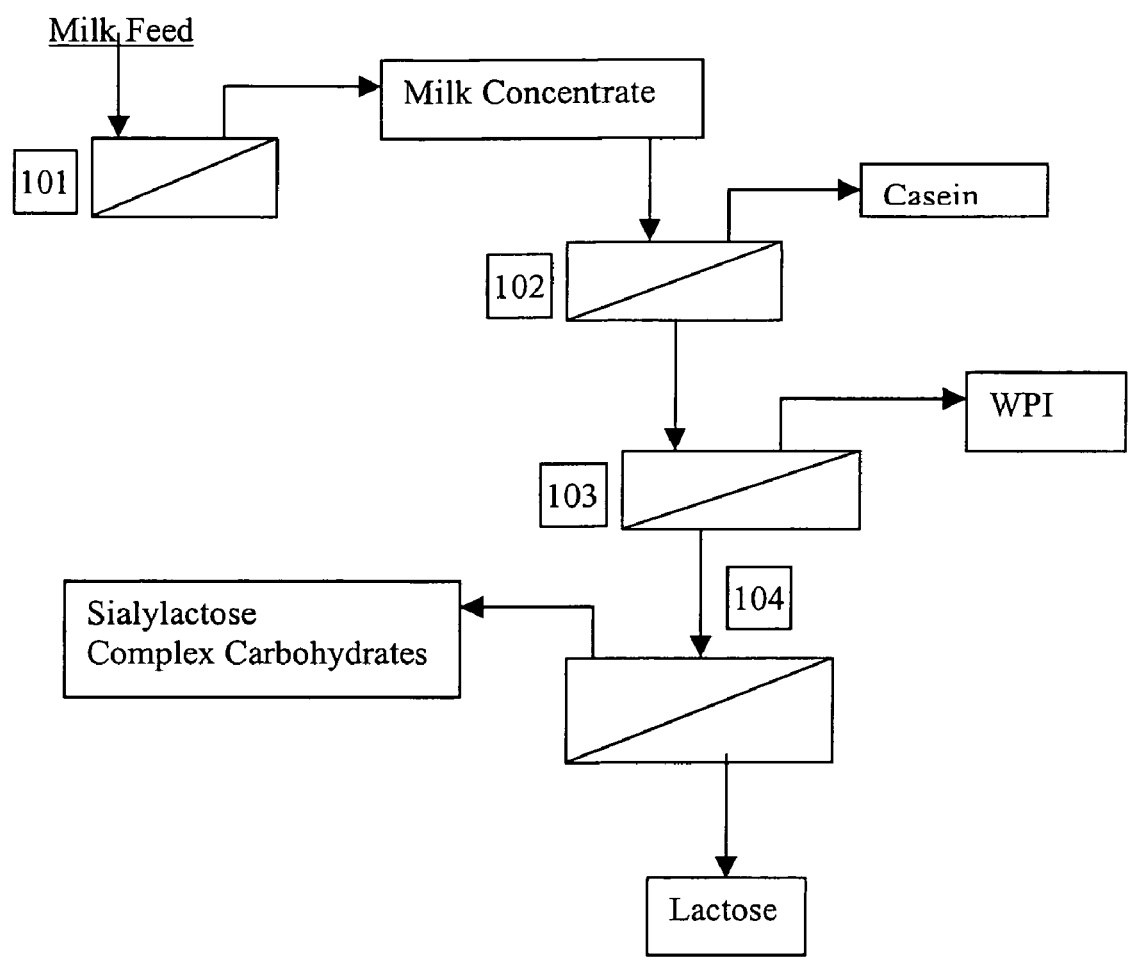
FIG. 10 is a flow chart showing yet another process for sequential fractionation of milk components from milk.
Figure 11:
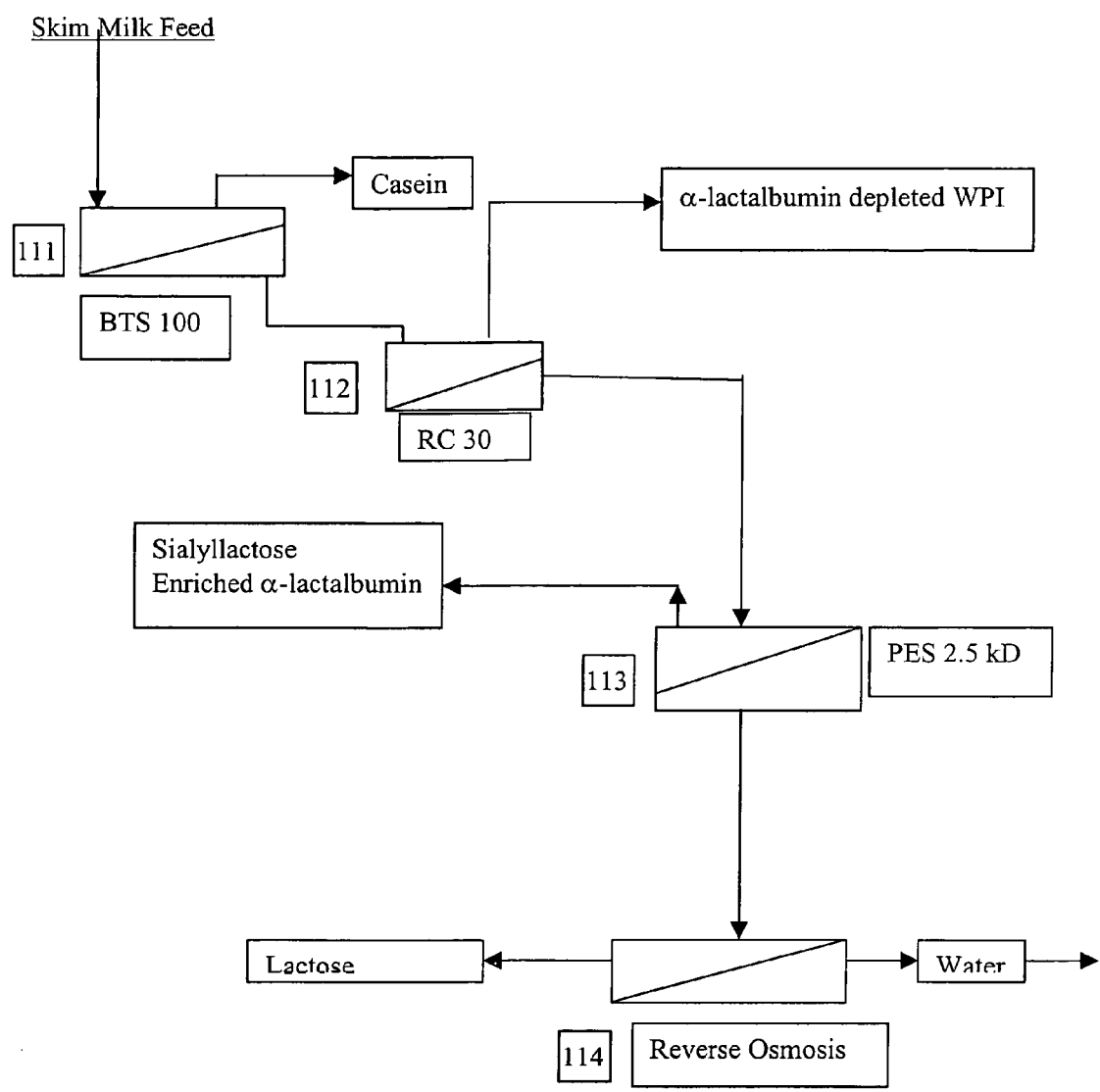
FIG. 11 is a flow chart demonstrating a process for manufacturing 3' sialyllactose-enriched α-lactalbumin.
Figure 12:
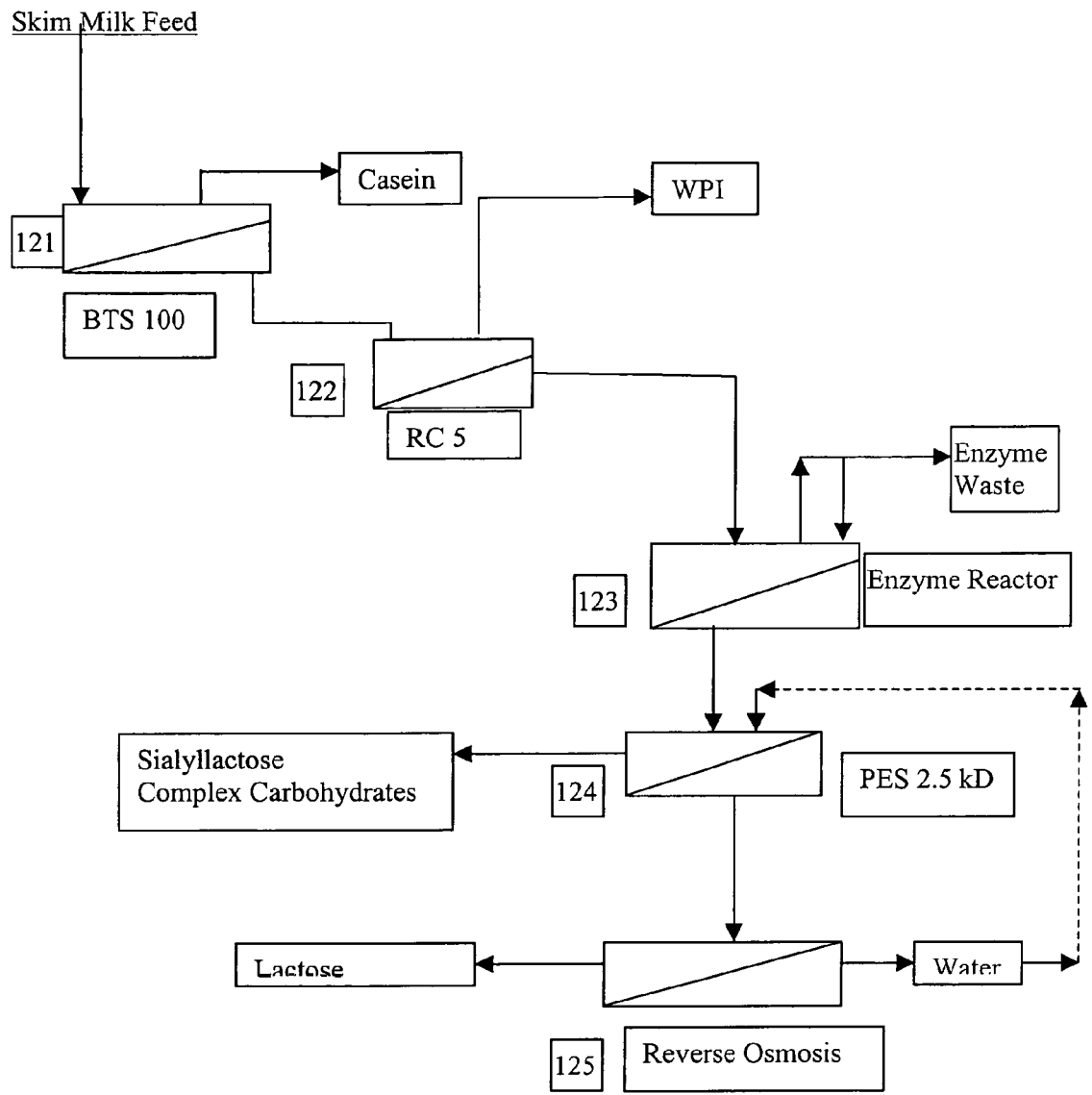
FIG. 12 is a flow chart demonstrating a process for manufacturing enzyme-enriched sialyllactose.
Figure 13:
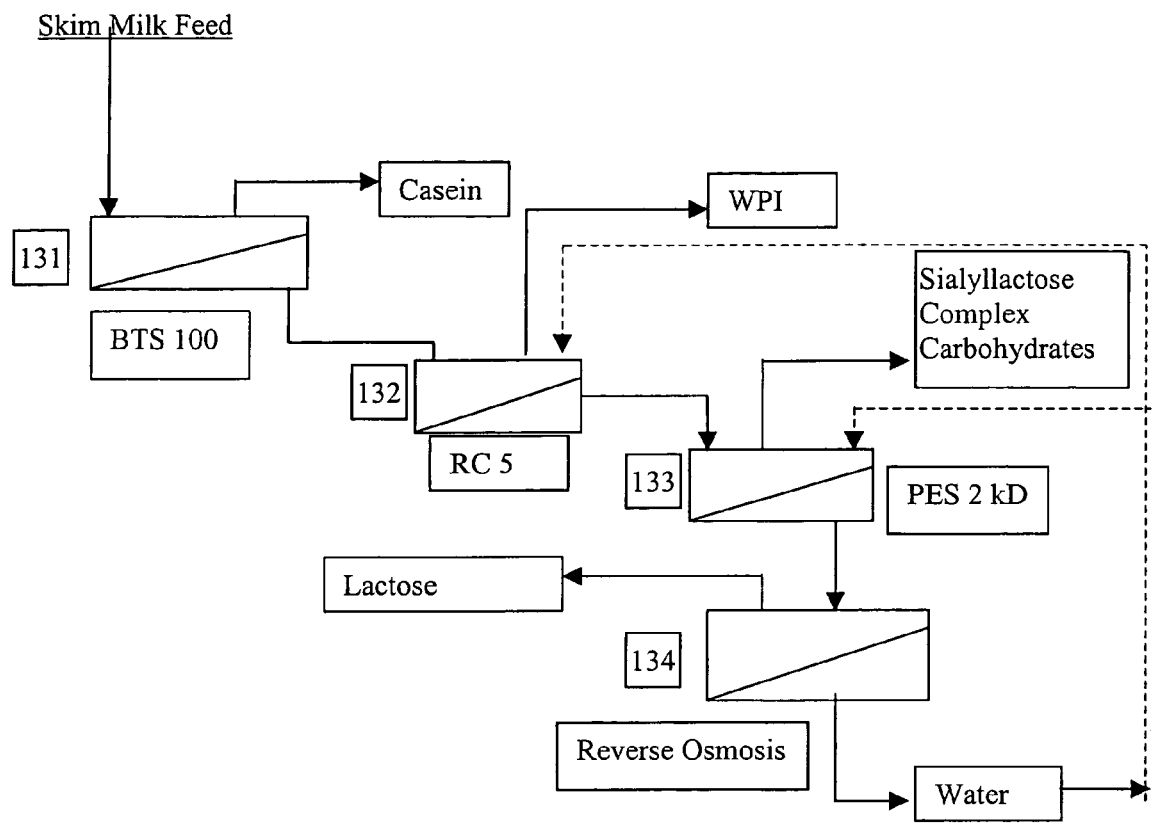
FIG. 13 is a flow chart showing a process for manufacturing sialyllactose.
Figure 14:
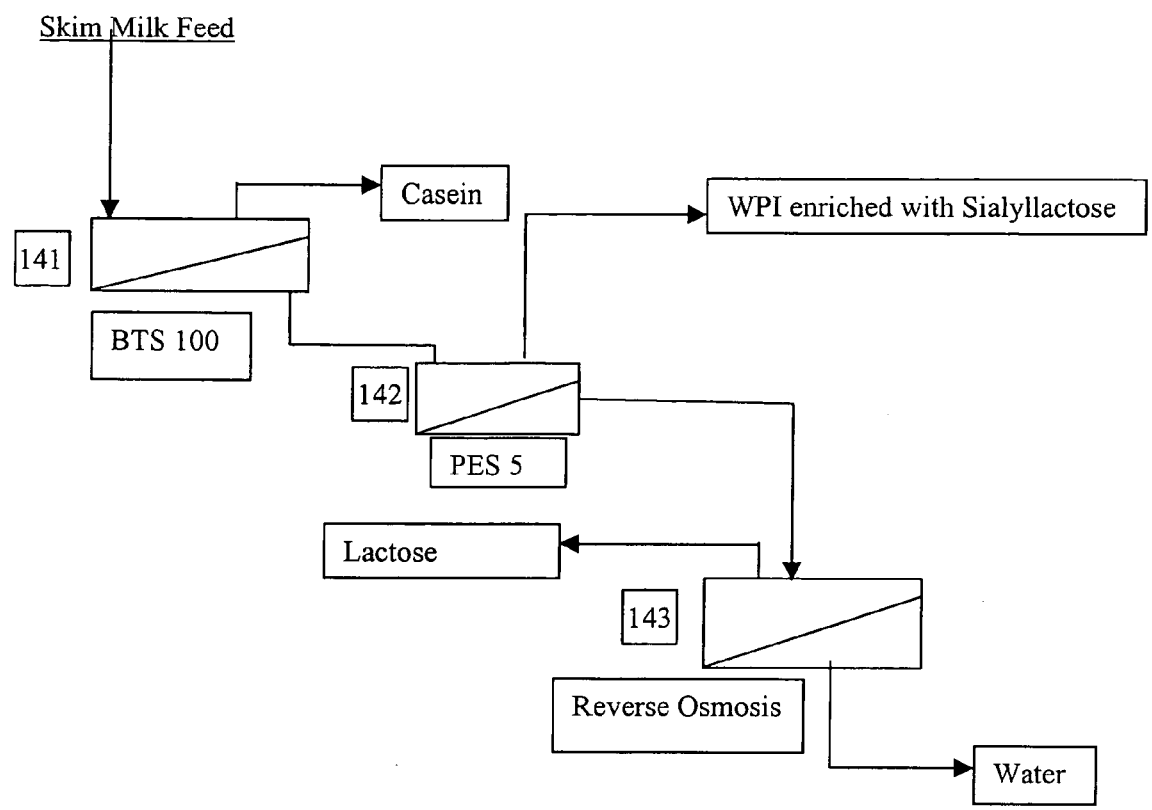
FIG. 14 is a flow chart showing a process for manufacturing sialyllactose-enriched whey protein isolate.

FIG. 7 illustrates yet another embodiment of the present invention, relating to a process for fractioning whey into fat and lipids, whey protein isolates (WPI), lactose, and water, using sequentially arranged filtration modules 71, 72, 73, and 74. Water generated by the last filtration module 74 can be recycled for cleaning and purging upstream filtration modules 72 and 73.

FIGS. 8-14 depict various embodiments of the present invention for separation of nutritional component from milk, or skim milk whey, using various filtration membranes.

The following table summarizes the characteristics of suitable membranes for specifically separating one or more milk components:

TABLE 1

CHOICE OF MEMBRANES

| Isolates/Retentate | Membrane Description (General) | Preferred Membrane |
|---|---|---|
| Milk Concentrate | Polymeric or Cellulosic 5,000-40,000 MW | Polymeric and 5,000-20,000 MW 5,000 MW |
| Milk Concentrate with Standarized Protein Content | Polymeric or Cellulosic 200,000-3,000,000 MW bubble point 65-120 psig | Polymeric and 80 to 100 PSIG (BTS*80 or BTS*100) Cellulosic 1,000,000 MW |
| Bacteria | Pore size 0.1-10 microns | Cellulosic, Ceramic and Polymeric |
| Fat and Lipids | Polymeric or Cellulosic 200,000-3,000,000 MW bubble point 65-120 psig | Polymeric and 80 psig (BTS* 80 or RC** 100) |
| Casein | 100,000-3,000,000 MW bubble point 65-120 psig | Polymeric and 80-100 psig (BTS* 100) |
| WPI | Polymeric 5,000-40,000 MW 5,000-20,000 MW 5,000-10,000 MW | Cellulosic and 5,000 MW (RC** 5) |
| Sialyllactose Enriched WPI | Polymeric 5,000-10,000 MW | (PES*** 5) |
| IgG & Albumin | Polymeric or Cellulosic 50,000-300,000 MW | (RC** 100) |
| Beta-lactoglobulin | Cellulosic 10,000-50,000 MW | (RC** 30) |
| Alpha-lactoglobulin depleted WPI | Cellulosic 20,000-40,000 MW | (RC** 30) |
| Beta-lactoglobulin, IgG, and Albumin | Cellulosic 20,000-40,000 MW | Cellulosic and 30,000 MW |
| Alpha-lactoglobulin | Polymeric or Cellulosic 1,000-20,000 MW | Cellulosic and 5,000 MW (RC** 5) |
| Sialyllactose or other complex carbohydrates | Polymeric 500-10,000 MW 800-5,000 MW | Polymeric + 1,000-3,500 MW Polymeric + 1,000-3,000 MW (PES**** 2 kD) |
| Lactose | Reverse Osmosis Polymeric + Cellulosic Rejecting >= 80% NaCl | Rejecting 98% of the lactose |
| Lactoferrin | Cellulosic 30,000-100,000 MW | |

The manufacturers of various commercially available membranes are listed as follows:
*BTS Membrane: U.S. Filters, San Diego, CA
**RC Membranes: Nadir Filtration GmbH, Wiesbaden, Germany
***PES 5 Membranes: Nadir Filtration GmbH, Wiesbaden, Germany
****PES 2 KD Membranes: Osmonics, Minnetonka, Minnesoda The following tables list permeate compositions and retentate yields from various membranes that may be employed in the broad practice of the present invention.

TABLE 2

Clarification of Whey[1] No Diafiltration

|  | Whey Feed Composition | BTS80 Permeate Composition | Retentive Yield |
|---|---|---|---|
| Fat and Lipids | 0.05% | 0.02% |  |
| Protein | 0.89% | 0.71% | 79.8% |
| Non-protein Nitrogen | 0.18% | 0.14% |  |
| Whey Protein Nitrogen | 0.65 mg N/g | 0.77 mg N/g |  |
| Undenatured Whey Protein | 58.4% | 86.18% |  |
| GMP | 0.95 mg/ml | 0.83 mg/ml | 87.4% |
| α-Lactalbumin | 0.10% | 0.08% | 80% |
| β-Lactoglobulin | 0.35% | 0.29% | 82.8% |
| IgG | <0.05% | <0.05% |  |
| Bovine Serum Albumin | <0.05% | <0.05% |  |
| Galactose, Enzymatic | 0.02% | 0.01% |  |
| Lactose, Enzymatic | 4.64% | 4.58% | 98.7% |
| Flow Velocity |  | 40 LM$^2$H |  |

[1]Sweet whey produced from manufacturing process of stirred curd cheddar, which has a pH value of 6.2 and a titratable acidity of 0.12.

TABLE 3

Concentration of Whey 10× with 7× Diafiltration by Two Membranes

|  | BTS80 Permeate Composition | PES5 Concentrate of BTS80 Permeate | RC5 Concentrate of BTS80 Permeate |
|---|---|---|---|
| Fat and Lipids | 0.02% | 0.06% | 0.01% |
| Protein | 0.71% | 7.33% | 7.47% |
| Non-protein Nitrogen | 0.14% | 0.36% | 0.23% |
| Whey Protein Nitrogen | 0.77 mg N/g | 11.08 mg N/g | 11.24 mg N/g |
| Undenatured Whey Protein | 86.18% | 100% | 99.04% |
| GMP | 0.83 mg/ml | 7.3 mg/ml | 7.0 mg/ml |
| α-Lactalbumin | 0.08% | 1.1% | 1.1% |
| β-Lactoglobulin | 0.29% | 4.1% | 4.5% |
| IgG | <0.05% | 0.38% | 0.42% |
| Bovine Serum Albumin | <0.05% | 0.22% | 0.24% |
| Galactose, Enzymatic | 0.01% | <0.01% | <0.01% |
| Lactose, Enzymatic | 4.58% | <0.01% | 0.05% |
| Flow Velocity | 40 LM$^2$H | 35 LM$^2$H | 32 LM$^2$H |

TABLE 4

WPI Membrane PES5 Concentrate and PES5 Permeate Pool (prior to diafiltration)

|  | BTS80 Permeate Composition | PES5 Concentrate of BTS80 Permeate | PES5 Permeate of BTS80 Permeate | Retentate Yield |
|---|---|---|---|---|
| Fat, Base Hydrolysis | 0.02% | 0.06% | 0.02% |  |
| Protein | 0.71% | 7.33% | 0.18% |  |
| Non-protein Nitrogen | 0.14% | 0.36% | 0.15% |  |
| Whey Protein Nitrogen | 0.77 mg N/g | 11.08 mg N/g | <0.01 mg N/g |  |
| Undenatured Whey Protein | 58.4% | 100% | Zero |  |
| GMP | 0.83 mg/ml | 7.3 mg/ml | <0.3 mg/ml | 87.9% |
| α-Lactalbumin | 0.08% | 1.1% | <0.05% | 100% |
| β-Lactoglobulin | 0.29% | 4.1% | <0.05% | 100% |
| IgG | <0.05% | 0.38% | <0.05% |  |
| Bovine Serum Albumin | <0.05% | 0.22% | <0.05% |  |
| Galactose, Enzymatic | 0.01% | <0.01% | 0.01% |  |
| Lactose, Enzymatic | 4.58% | <0.01% | 4.62% | No Lactose |
| Flow Velocity | 40 LM$^2$H | 35 LM$^2$H |  |  |

TABLE 5

WPI Membrane RC5 Concentrate and RC5 Permeate Pool (prior to diafiltration)

|  | BTS80 Permeate Composition | RC5 Concentrate of BTS80 Permeate | RC5 Permeate of BTS80 Permeate | Retentate Yield |
|---|---|---|---|---|
| Fat, Base Hydrolysis | 0.02% | 0.01% | 0.02% |  |
| Protein | 0.71% | 7.47% | 0.18% |  |
| Non-protein Nitrogen | 0.14% | 0.23% | 0.10% |  |
| Whey Protein Nitrogen | 0.77 mg N/g | 11.24 mg N/g | <0.01 mg N/g |  |
| Undenatured Whey Protein | 58.4% | 99.04% | Zero |  |
| GMP | 0.83 mg/ml | 7.0 mg/ml | <0.3 mg/ml | 84.3% |
| α-Lactalbumin | 0.08% | 1.1% | <0.05% | 100% |
| β-Lactoglobulin | 0.29% | 4.5% | <0.05% | 100% |

TABLE 5-continued

WPI Membrane RC5 Concentrate and RC5 Permeate Pool (prior to diafiltration)

| | BTS80 Permeate Composition | RC5 Concentrate of BTS80 Permeate | RC5 Permeate of BTS80 Permeate | Retentate Yield |
|---|---|---|---|---|
| IgG | <0.05% | 0.42% | <0.05% | |
| Bovine Serum Albumin | <0.05% | 0.24% | <0.05% | |
| Galactose, Enzymatic | 0.01% | <0.01% | 0.01% | |
| Lactose, Enzymatic | 4.58% | 0.05% | 4.25% | 0.05% |
| Flow Velocity | 40 LM$^2$H | 32 LM$^2$H | | |

TABLE 6

10x concentration and 10x Diafiltration of Starting Material

| | BTS80 Permeate Composition | RC30 Concentrate of BTS80 Permeate (β-Lactoglobulin Fraction) | PES5 Concentrate of RC30 Permeate (α-Lactalbumin Fraction) | Retentive Yields |
|---|---|---|---|---|
| Fat, Base Hydrolysis | 0.02% | <0.01% | <0.01% | |
| Protein (Kjeldahl) | 0.71% | 4.45% | 1.56% | |
| Non-protein Nitrogen | 0.14% | 0.09% | 0.13% | |
| Whey Protein Nitrogen | 0.77 mg N/g | 6.76 mg N/g | 2.03 mg N/g | |
| Undenatured Whey Protein | 58.4% | 98.9% | 90.5% | |
| GMP | 0.83 mg/ml | 3.1 mg/ml | 2.7 mg/ml | |
| α-Lactalbumin | 0.08% | 0.15% | 0.53% | 66.2% (84.1% Purity) |
| β-Lactoglobulin | 0.29% | 3.5% | 0.08% | 100% (82.9% Purity) |
| IgG | <0.05% | 0.32% | <0.05% | |
| Bovine Serum Albumin | <0.05% | 0.20% | <0.05% | |
| Galactose, Enzymatic | 0.01% | <0.01% | <0.01% | |
| Lactose, Enzymatic | 4.58% | <0.01% | <0.01% | No Lactose |
| Flow Velocity | 40 LM$^2$H | 32 LM$^2$H | 45 LM$^2$H | |

While the invention has been described herein with respect to various illustrative aspects, features and embodiments thereof, it will be recognized that the invention is not thus limited, but that the present invention extends to and encompasses other features, modifications, and alternative embodiments, as will readily suggest themselves to those of ordinary skill in the art based on the disclosure and illustrative teachings herein. The claims that follow are therefore to be construed and interpreted as including all such features, modifications and alternative embodiments, within their spirit and scope.

What is claimed is:

1. An apparatus system for separating milk components and capturing a lactose rich fraction, comprising:

a milk source;

one or more cross-flow filtration modules communicatively connected to said milk source, for generating one or more filtration fractions wherein the cross-flow filtration modules comprise a feed inlet, a retentate outlet, a permeate outlet, a multiplicity of filter sheets in an operative stacked arrangement, wherein the filter sheets alternate with permeate and retentate sheets, wherein the retentate sheet comprises multiple fluid-flow channels each extending between the feed inlet and retentate outlet, wherein the fluid flow channels are of equal length to one another as measured between the inlet and the outlet, and wherein as a liquid to be filtered flows across the filter sheets, solids or high-molecular-weight species of diameter larger than the filter sheet's pore size, are retained in the retentate flow, and the liquid along with any permeate species diffuse through the filter sheets and enter the permeate sheet to the permeate outlet;

wherein the system for capturing a lactose rich fraction comprises the following cross-flow filtration modules and fluid collection conduits:

an optional first cross-flow filtration module downstream of the milk source and communicatively connected thereto for filtering out all or at least a portion of bacteria contained in the milk;

a second cross-flow filtration module, downstream of the first cross-flow filtration module if the first cross flow filtration module is provided and communicatively connected thereto, or if the first cross flow filtration module is not the provided, then the second cross-flow filtration module is communicatively connected directly to the milk source, which separates the milk into a casein-rich fraction and a casein-depleted fraction;

a first fluid collection conduit connected to said second cross-flow filtration module for capturing the casein-rich fraction;

a third cross-flow filtration module downstream of the second cross-flow filtration module and communicatively connected thereto, which receives the casein-depleted fraction and further separates it into a fraction that is enriched with albumin and immunoglobulins and a fraction that is depleted of albumin and immunoglobulins;

a second fluid collection conduit connected to said third cross-flow filtration module for capturing the fraction that is enriched with albumin and immunoglobulins;

a fourth cross-flow filtration module downstream of the third cross-flow filtration module and communicatively connected thereto, which receives the fraction that is depleted of albumin and immunoglobulins and further separates it into a β-lactoglobulin-rich fraction and a β-lactoglobulin-depleted fraction;

a third fluid collection conduit connected to said fourth cross-flow filtration module for capturing the β-lactoglobulin-rich fraction;

a fifth cross-flow filtration module downstream of the fourth cross-flow filtration module and communicatively connected thereto, which receives the β-lactoglobulin-depleted fraction and further separates it into a α-lactalbumin-rich fraction and a α-lactalbumin-depleted fraction;

a fourth fluid collection conduit connected to said fifth cross-flow filtration module for capturing the α-lactalbumin-rich fraction;

a sixth cross-flow filtration module downstream of the fifth cross-flow filtration module and communicatively connected thereto, which receives the α-lactalbumin-depleted fraction and further separates it into a complex carbohydrates rich fraction and a complex carbohydrates depleted fraction;

a fifth fluid collection conduit connected to said sixth cross-flow filtration module for capturing the complex carbohydrates rich fraction;

a seventh cross-flow filtration module downstream of the sixth cross-flow filtration module and communicatively connected thereto, which receives the complex carbohydrates depleted fraction and further separates it into a lactose-rich fraction and a lactose-depleted fraction; and a sixth fluid collection conduit connected to said seventh cross-flow filtration module for capturing the lactose-rich fraction;

a discharge conduit for discharging and/or recycling the lactose-depleted fraction.

2. An apparatus according to claim 1, further comprising a pasteurizer upstream and/or downstream of any of the cross-flow filtration modules for pasteurizing the milk source or any one or more filtration fractions generated by the cross-flow filtration modules.

3. An apparatus according to claim 2, further comprising a cream separator upstream of said cross-flow filtration modules for removing all or at least a portion of fatty component from the milk.

4. An apparatus system for separating milk components and capturing an α-lactalbumin-depleted fraction comprising:

a milk source;

one or more cross-flow filtration modules communicatively connected to said milk source for generating one or more filtration fractions wherein the cross-flow filtration modules comprise a feed inlet connected to a fluid delivery conduit, a retentate outlet, a permeate outlet, a multiplicity of filter sheets in an operative stacked arrangement, wherein the filter sheets alternate with permeate and retentate sheets, wherein the retentate sheet comprises multiple fluid-flow channels each extending between the feed inlet and retentate outlet, wherein the fluid flow channels are of equal length to one another as measured between the inlet and the outlet, and wherein as a liquid to be filtered flows across the filter sheets, solids or high-molecular-weight species of diameter larger than the filter sheet's pore size, are retained in the retentate flow, and the liquid along with any permeate species diffuse through the filter sheets and enter the permeate sheet to the permeate outlet;

wherein the system for capturing an α-lactalbumin-depleted fraction comprises the following cross-flow filtration modules and fluid collection conduits:

a first cross-flow filtration module downstream of the milk source and communicatively connected thereto for filtering out all or at least a portion of bacteria contained in the milk;

a second cross-flow filtration module downstream of said first cross-flow filtration module or the milk source and communicatively connected to said first cross-flow filtration or the milk source, which separates the milk into a casein-rich fraction and a casein-depleted fraction;

a first fluid collection conduit connected to said second cross-flow filtration module for capturing the casein-rich fraction;

a third cross-flow filtration module downstream of the second cross-flow filtration module and communicatively connected thereto, which receives the casein-depleted fraction and further separates it into a β-lactoglobulin-rich fraction and a β-lactoglobulin-depleted fraction;

a second fluid collection conduit connected to said third cross-flow filtration module for capturing the β-lactoglobulin-rich fraction;

a fourth cross-flow filtration module downstream of the third cross-flow filtration module and communicatively connected thereto, which receives the β-lactoglobulin-depleted fraction and further separates it into a α-lactalbumin-rich fraction and a α-lactalbumin-depleted fraction;

a third fluid collection conduit connected to said fourth cross-flow filtration module for capturing the α-lactalbumin-rich fraction; and a fourth fluid collection conduit connected to said fourth cross-flow filtration module for capturing the α-lactalbumin-depleted fraction for subsequent processing selected from the group consisting of cross-flow filtration, lactose recovery, discharging, recycling, capturing, further processing and recycling.

5. An apparatus according to claim 4, further comprising a pasteurizer upstream and/or downstream of any of the cross-flow filtration modules for pasteurizing the milk source or any one or more filtration fractions generated by the cross-flow filtration modules.

6. An apparatus according to claim 5, further comprising temperature controller or monitor for controlling and monitoring temperature of said milk and/or filtration fractions generated by the cross-flow filtration modules.

7. An apparatus according to claim 5, further comprising a cream separator upstream of said cross-flow filtration modules for removing all or at least a portion of fatty component from the milk.

8. An apparatus for separating milk components and capturing an α-lactalbumin-rich fraction, comprising:

a milk source;

one or more cross-flow filtration modules communicatively connected to said milk source for generating one or more filtration fractions wherein the cross-flow filtration modules comprise a feed inlet connected to a fluid delivery conduit, a retentate outlet, a permeate outlet, a multiplicity of filter sheets in an operative stacked arrangement, wherein the filter sheets alternate with permeate and retentate sheets, wherein the retentate sheet comprises multiple fluid-flow channels each extending between the feed inlet and retentate outlet, wherein the fluid flow channels are of equal length to one another as measured between the inlet and the outlet, and wherein as a liquid to be filtered flows across the filter sheets, solids or high-molecular-weight species of diameter larger than the filter sheet's pore size, are retained in the retentate flow, and the liquid along with any permeate species diffuse through the filter sheets and enter the permeate sheet to the permeate outlet;

wherein the apparatus for capturing an α-lactalbumin-depleted fraction comprises the following cross-flow filtration modules and fluid collection conduits:

an optional first cross-flow filtration module downstream of the milk source and communicatively connected thereto by a fluid delivery conduit wherein the first cross-flow filtration module is used for filtering out all or at least a portion of bacteria contained in the milk;

a second cross-flow filtration module, downstream of the first cross-flow filtration module if the first cross flow filtration module is in the system and communicatively connected thereto, or in the alternative if the first cross flow filtration module is not provided, then the second cross-flow filtration module is communicatively connected directly to the milk source, which separates the milk into a casein-rich fraction and a casein-depleted fraction;

a first fluid collection conduit connected to said second cross-flow filtration module for capturing the casein-rich fraction;

a third cross-flow filtration module downstream of the second cross-flow filtration module and communicatively connected thereto, which receives the casein-depleted fraction and further separates it into a fraction that is enriched with albumin and immunoglobulins and a fraction that is depleted of albumin and immunoglobulins;

a second fluid collection conduit connected to said third cross-flow filtration module for capturing the fraction that is enriched with albumin and immunoglobulins;

a fourth cross-flow filtration module downstream of the third cross-flow filtration module and communicatively connected thereto, which receives the fraction that is depleted of albumin and immunoglobulins and further separates it into a β-lactoglobulin-rich fraction and a β-lactoglobulin-depleted fraction;

a third fluid collection conduit connected to said fourth cross-flow filtration module for capturing the β-lactoglobulin-rich fraction;

a fifth cross-flow filtration module downstream of the fourth cross-flow filtration module and communicatively connected thereto, which receives the β-lactoglobulin-depleted fraction and further separates it into a α-lactalbumin-rich fraction and a α-lactalbumin-depleted fraction;

a fourth fluid collection conduit connected to said fifth cross-flow filtration module for capturing the α-lactalbumin-rich fraction;

a fifth fluid collection conduit connected to said fifth cross-flow filtration module for capturing the α-lactalbumin-depleted fraction for subsequent processing selected from the group consisting of cross-flow filtration, lactose recovery, discharging, recycling, capturing, further processing and recycling.

9. An apparatus according to claim 8, further comprising a pasteurizer upstream and/or downstream of any of the cross-flow filtration modules for pasteurizing the milk source or any one or more filtration fractions generated by the cross-flow filtration modules.

10. An apparatus according to claim 8, comprising multiple fluid delivery conduits arranged in a manner that each cross-flow filtration module is connected to at least one fluid delivery conduit, said fluid delivery conduits functioning to effectuate a flow of the milk or a fraction of the milk through each cross-flow filtration module.

11. An apparatus according to claim 8, further comprising temperature controller or monitor for controlling and monitoring temperature of said milk and/or filtration fractions generated by the cross-flow filtration modules.

12. An apparatus according to claim 8, further comprising a cream separator upstream of said cross-flow filtration modules for removing all or at least a portion of fatty component from the milk.

13. The apparatus of claim 1, wherein the milk source comprises a transgenic or hyper-immunized mammal.

14. A system for sequentially fractionating milk, comprising:
(a) a source of milk;
(b) a first cross-flow filtration module in fluid communication with said source of milk for separating the milk into a casein-rich retentate fraction and a casein-depleted permeate fraction;
(c) a first fluid collection conduit connected to said first cross-flow filtration module for capturing the casein-rich retentate fraction;
(d) a second cross-flow filtration module in fluid communication with said first cross-flow filtration module for separating the casein-depleted permeate fraction into a protein concentrate fraction and a protein-depleted permeate fraction;
(e) a second fluid collection conduit connected to said second cross-flow filtration module for capturing or discharging the protein-depleted permeate fraction;
(f) a third cross-flow filtration module in fluid communication with said second cross-flow filtration module for separating the protein concentrate fraction into a β-lactoglobulin-rich fraction and a β-lactoglobulin-depleted permeate fraction;
(g) a third fluid collection conduit connected to said third cross-flow filtration module for capturing the β-lactoglobulin-rich fraction;
(h) a fourth cross-flow filtration module in fluid communication with said third cross-flow filtration module for separating the β-lactoglobulin-depleted fraction into an α-lactalbumin-rich fraction and an α-lactalbumin-depleted permeate fraction;
(i) a fourth fluid collection conduit connected to said fourth cross-flow filtration module for capturing the α-lactalbumin-rich fraction; and
(j) a fifth fluid collection conduit connected to said fourth cross-flow filtration module for capturing or discharging the α-lactalbumin-depleted permeate fraction.

* * * * *